US012586336B2

(12) United States Patent
Ryu

(10) Patent No.: US 12,586,336 B2
(45) Date of Patent: Mar. 24, 2026

(54) WEARABLE DEVICE, METHOD, AND NON-TRANSITORY COMPUTER READABLE STORAGE MEDIUM CONTROLLING LIGHT RADIATION OF LIGHT SOURCE

(71) Applicant: Samsung Electronics Co., Ltd., Suwon-si (KR)

(72) Inventor: Jisu Ryu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/663,581

(22) Filed: May 14, 2024

(65) Prior Publication Data

US 2025/0014301 A1 Jan. 9, 2025

Related U.S. Application Data

(63) Continuation of application No. PCT/KR2024/005424, filed on Apr. 22, 2024.

(30) Foreign Application Priority Data

Jul. 3, 2023 (KR) ........................ 10-2023-0085928
Aug. 30, 2023 (KR) ........................ 10-2023-0114948

(51) Int. Cl.
G06V 10/141 (2022.01)
G06T 7/20 (2017.01)
(Continued)

(52) U.S. Cl.
CPC .............. *G06V 10/141* (2022.01); *G06T 7/20* (2013.01); *G06V 40/19* (2022.01); *G06V 40/197* (2022.01);
(Continued)

(58) Field of Classification Search
CPC .... G06V 10/141; G06V 40/19; G06V 40/197; G06V 40/193; G06T 7/20;
(Continued)

(56) References Cited

U.S. PATENT DOCUMENTS 9,977,960 B2 5/2018 Gustafsson et al.
11,138,429 B2 10/2021 Eskilsson et al.
(Continued)

FOREIGN PATENT DOCUMENTS

CN 106339087 A 1/2017
CN 106778713 A 5/2017
(Continued)

OTHER PUBLICATIONS

International Search Report dated Aug. 8, 2024, issued in International Application No. PCT/KR2024/005424.

*Primary Examiner* — Shadan E Haghani
(74) *Attorney, Agent, or Firm* — Jefferson IP Law, LLP

(57) ABSTRACT

A wearable device is provided. The wearable device includes a plurality of light sources configured to emit light toward an eye of a user wearing the wearable device. The wearable device includes a camera configured to capture images of at least a part of the eye of the user wearing the wearable device. The wearable device includes at least one processor comprising processing circuitry. The wearable device includes memory, comprising one or more storage mediums, storing instructions. The wearable device performs eye tracking based on the images captured by the camera while the plurality of the light sources are controlled to emit light toward the eye of the user. The wearable device performs iris recognition based on at least one image captured by the camera while a portion of the plurality of the
(Continued)

light sources is controlled to emit light toward the eye of the user and a remaining portion of the plurality of the light sources is deactivated.

18 Claims, 21 Drawing Sheets

(51) Int. Cl.

| | |
|---|---|
| *G06V 40/18* | (2022.01) |
| *G06V 40/19* | (2022.01) |
| *H04N 23/56* | (2023.01) |
| *H04N 23/90* | (2023.01) |

(52) U.S. Cl.

CPC ............. *H04N 23/56* (2023.01); *H04N 23/90* (2023.01); *G06T 2207/10152* (2013.01); *G06T 2207/30201* (2013.01)

(58) Field of Classification Search

CPC ........... G06T 2207/10152; G06T 2207/30201; H04N 23/56; H04N 23/90

See application file for complete search history.

(56) References Cited

U.S. PATENT DOCUMENTS

| | | | | |
|---|---|---|---|---|
| 11,143,869 | B2 | 10/2021 | Liu et al. | |
| 2004/0170304 | A1* | 9/2004 | Haven ................... | G06V 40/19 |
| | | | | 382/115 |
| 2016/0283790 | A1 | 9/2016 | Douglas et al. | |
| 2019/0278987 | A1* | 9/2019 | Eskilsson ........... | G02B 27/0093 |
| 2019/0369718 | A1* | 12/2019 | Wei ...................... | H04N 13/344 |
| 2020/0012105 | A1* | 1/2020 | Liu ......................... | H04N 23/20 |
| 2020/0201430 | A1* | 6/2020 | Wei ......................... | G06N 5/046 |
| 2021/0097319 | A1* | 4/2021 | Arvidsson .............. | G06V 40/18 |
| 2021/0132384 | A1 | 5/2021 | Liao et al. | |
| 2022/0300073 | A1 | 9/2022 | Reshidko et al. | |
| 2023/0122744 | A1 | 4/2023 | Cho et al. | |
| 2023/0240591 | A1* | 8/2023 | De Bock ................ | A61B 5/445 |
| | | | | 600/306 |

FOREIGN PATENT DOCUMENTS

| | | | |
|---|---|---|---|
| CN | 111950382 | A | 11/2020 |
| CN | 111950384 | A | 11/2020 |
| CN | 115671705 | A | 2/2023 |
| KR | 10-2019-0108603 | A | 9/2019 |
| WO | 2018/201067 | A1 | 11/2018 |

* cited by examiner

RECEIVE INPUT TO EMIT LIGHT FROM LIGHT SOURCE — 710

EMIT LIGHT FROM LIGHT SOURCE CORRESPONDING TO INPUT — 720

WEARABLE DEVICE, METHOD, AND NON-TRANSITORY COMPUTER READABLE STORAGE MEDIUM CONTROLLING LIGHT RADIATION OF LIGHT SOURCE

CROSS-REFERENCE TO RELATED APPLICATION(S)

This application is a continuation application, claiming priority under § 365 (c), of an International application No. PCT/KR2024/005424, filed on Apr. 22, 2024, which is based on and claims the benefit of a Korean patent application number 10-2023-0085928, filed on Jul. 3, 2023, in the Korean Intellectual Property Office, and of a Korean patent application number 10-2023-0114948, filed on Aug. 30, 2023, in the Korean Intellectual Property Office, the disclosure of each of which is incorporated by reference herein in its entirety.

TECHNICAL FIELD

The disclosure relates to a wearable device, method, and non-transitory computer readable storage medium controlling light radiation of a light source.

BACKGROUND ART

In order to provide enhanced user experience, an electronic device that provides an augmented reality (AR) service that displays information generated by a computer in connection with an external object in the real-world is being developed. The electronic device may be a wearable device capable of worn by a user. For example, the electronic device may be AR glasses and/or a head-mounted device (HMD).

The above information is presented as background information only to assist with an understanding of the disclosure. No determination has been made, and no assertion is made, as to whether any of the above might be applicable as prior art with regard to the disclosure.

DISCLOSURE

Technical Solution

Aspects of the disclosure are to address at least the above-mentioned problems and/or disadvantages and to provide at least the advantages described below. Accordingly, an aspect of the disclosure is to provide a wearable device, method, and non-transitory computer readable storage medium controlling light radiation of a light source.

Additional aspects will be set forth in part in the description which follows and, in part, will be apparent from the description, or may be learned by practice of the presented embodiments.

A wearable device is provided. The wearable device may comprise a camera configured to capture images of at least a part of the eye of the user wearing the wearable device. The wearable device may comprise at least one processor comprising processing circuitry. The wearable device may comprise memory, comprising one or more storage mediums, storing instructions. The instructions that, when executed by the at least one processor individually or collectively, may cause the wearable device to perform eye tracking based on the images captured by the camera while the plurality of light sources are controlled to emit light toward the eye of the user. The instructions that, when executed by the at least one processor individually or collectively, may cause the wearable device to perform iris recognition based on at least one image captured by the camera while a portion of the plurality of the light sources is controlled to emit light toward the eye of the user and a remaining portion of the plurality of the light sources is deactivated.

A method performed by a wearable device comprising a plurality of light sources configured to emit light toward an eye of a user wearing the wearable device and a camera configured to capture images of at least a part of the eye of the user wearing the wearable device is provided. The method may comprise performing eye tracking based on the images captured by the camera while the plurality of the light sources are controlled to emit light toward the eye of the user. The method may comprise performing iris recognition based on at least one image captured by the camera while a portion of the plurality of the light sources is controlled to emit light toward the eye of the user and a remaining portion of the plurality of the light sources is deactivated.

A non-transitory computer readable storage medium is provided. The non-transitory computer readable storage medium may store one or more programs including instructions. The instructions that, when executed by a processor of a wearable device comprising a plurality of light sources configured to emit light toward an eye of a user wearing the wearable device and a camera configured to capture images of at least a part of the eye of the user wearing the wearable device, may cause the wearable device to perform eye tracking based on the images captured by the camera while the plurality of the light sources are controlled to emit light toward the eye of the user. The instructions that, when executed by the processor, may cause the wearable device to perform iris recognition based on at least one image captured by the camera while a portion of the plurality of the light sources is controlled to emit light toward the eye of the user and a remaining portion of the plurality of the light sources is deactivated.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a wireless fidelity (Wi-Fi) chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like.

Figure 1:
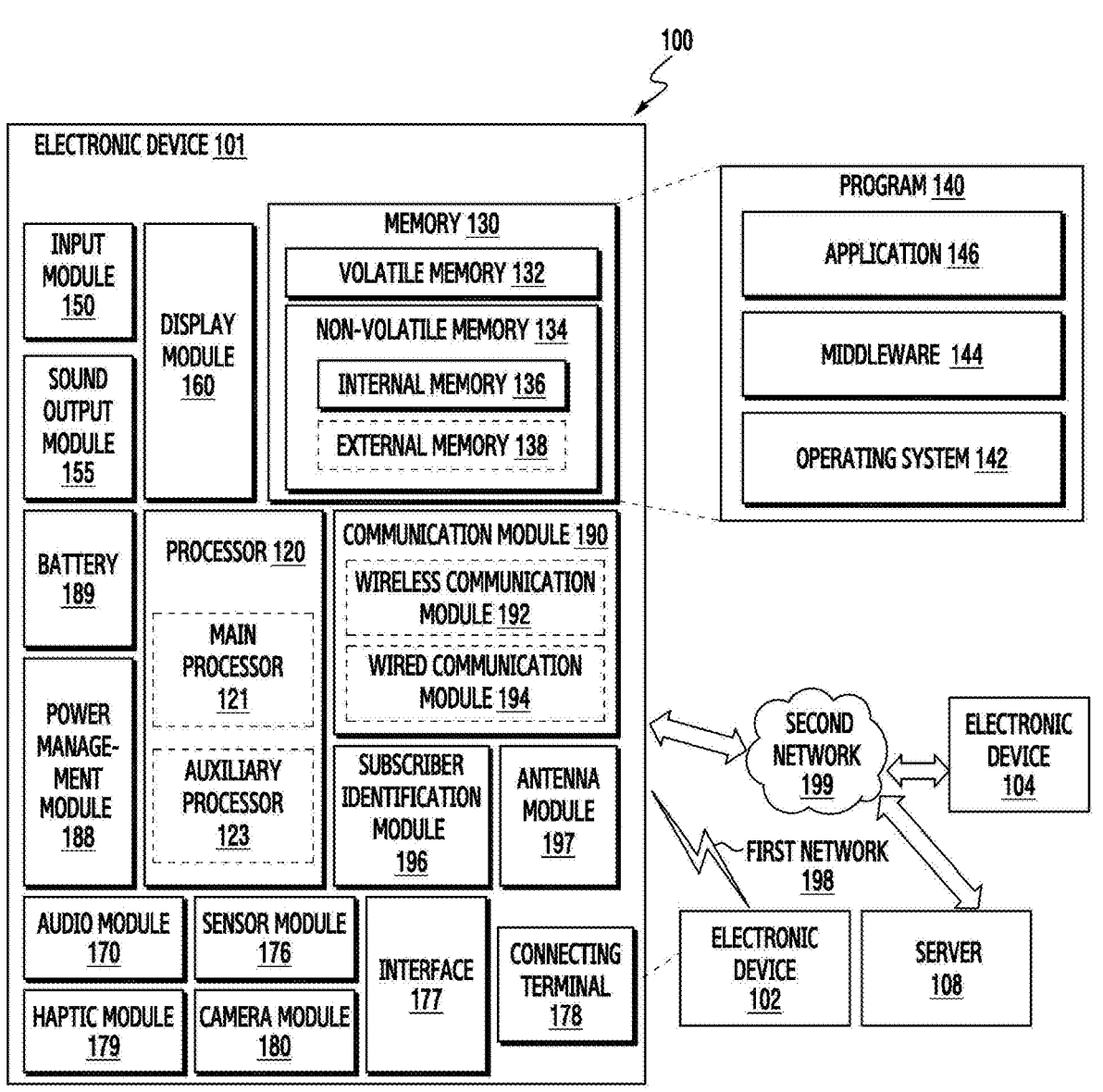
FIG. 1 is a block diagram of an electronic device in a network environment, according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semisupervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

The connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices (e.g., electronic devices 102 and 104 or server 108). For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
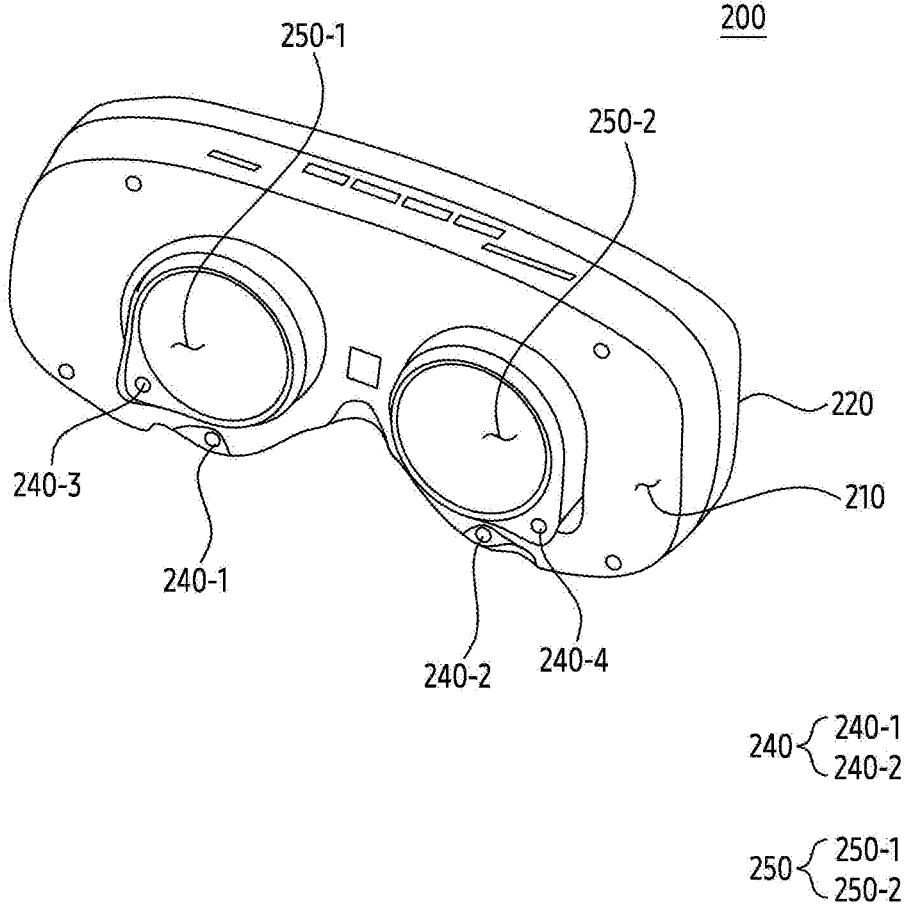
FIG. 2A illustrates an example of an exterior of a first surface of a wearable device, according to an embodiment of the disclosure.
Figure 2B:
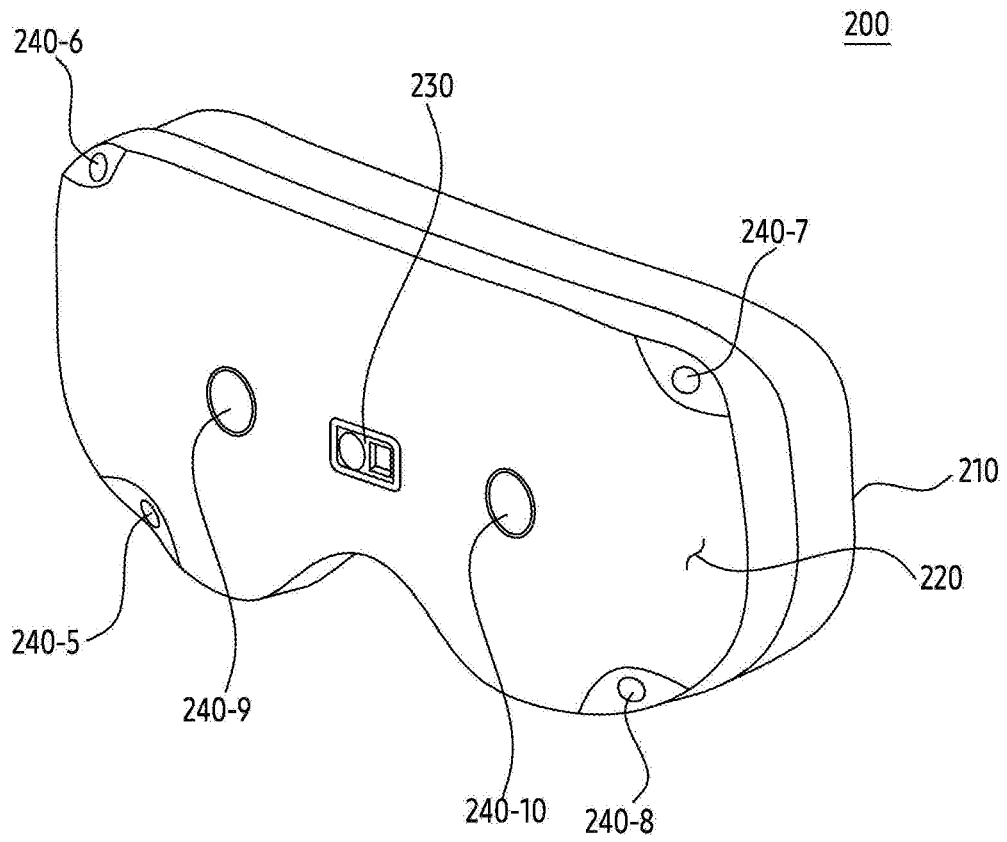
FIG. 2B illustrates an example of an exterior of a second surface of a wearable device, according to an embodiment of the disclosure.

FIG. 2A illustrates an example of an exterior of a first surface of a wearable device, according to an embodiment of the disclosure. FIG. 2B illustrates an example of an exterior of a second surface of a wearable device, according to an embodiment of the disclosure.

Wearable device 200 of FIGS. 2A to 2B may be the electronic device 101 described in FIG. 1. An example of an exterior of a first surface 210 of a housing of wearable device 200 may be illustrated in FIG. 2A, and an example of an exterior of a second surface 220 opposite to the first surface 210 may be illustrated in FIG. 2B.

Referring to FIG. 2A, according to an embodiment, a first surface 210 of a wearable device 200 may have an attachable shape on the user's body part (e.g., the user's face). Although not illustrated, the wearable device 200 may further include a strap for being fixed on the user's body part, and/or one or more temples.

A first display 250-1 for outputting an image to the left eye among the user's both eyes and a second display 250-2 for outputting an image to the right eye among the user's both eyes may be disposed on the first surface 210. The wearable device 200 may be formed on the first surface 210 and may further include rubber or silicon packing for preventing interference by light (e.g., ambient light) different from the light emitted from the first display 250-1 and the second display 250-2.

According to an embodiment, the wearable device 200 may include cameras 240-1 and 240-2 for photographing and/or tracking both eyes of the user adjacent to each of the first display 250-1 and the second display 250-2. The cameras 240-1 and 240-2 may be referred to as an eye tracking (ET) camera. According to an embodiment, the wearable device 200 may include cameras 240-3, 240-4, and 240-11 for photographing and/or recognizing the user's face. The cameras 240-3, 240-4, and 240-11 may be referred to as a face tracking (FT) cameras.

Referring to FIG. 2B, a camera (e.g., cameras 240-5, 240-6, 240-7, 240-8, 240-9, and 240-10), and/or a sensor (e.g., a depth sensor 230) for obtaining information associated with the external environment of the wearable device 200 may be disposed on the second surface 220 opposite to the first surface 210 of FIG. 2A. For example, the cameras 240-5, 240-6, 240-7, 240-8, 240-9, and 240-10 may be disposed on the second surface 220 in order to recognize an external object different from the wearable device 200. For example, by using cameras 240-9, and 240-10, the wearable device 200 may obtain an image and/or video to be transmitted to each of the user's both eyes. The camera 240-9 may be disposed on the second surface 220 of the wearable device 200 to obtain an image to be displayed through the second display 250-2 corresponding to the right eye among both eyes. The camera 240-10 may be disposed on the second surface 220 of the wearable device 200 to obtain an image to be displayed through the first display 250-1 corresponding to the left eye among both eyes.

According to an embodiment, the wearable device 200 may include the depth sensor 230 disposed on the second surface 220 in order to identify a distance between the wearable device 200 and the external object. By using the depth sensor 230, the wearable device 200 may obtain spatial information (e.g., a depth map) about at least a portion of a field of view (FoV) of the user wearing the wearable device 200.

Although not illustrated, a microphone for obtaining sound outputted from the external object may be disposed on the second surface 220 of the wearable device 200. The number of microphones may be one or more according to embodiments.

As described above, according to an embodiment, the wearable device 200 may have a form factor for being worn on the user's head. In a state of being worn on the head, the wearable device 200 may provide a user experience based on augmented reality, virtual reality, and/or mixed reality. By using the cameras 240-5, 240-6, 240-7, 240-8, 240-9, and 240-10 for recording a video about an external space, the wearable device 200 and a server (e.g., a server 108 of FIG. 1) connected to the wearable device 200 may provide an on-demand service that provides a video of a location and/or a place selected by the user and/or a metaverse service.

According to an embodiment, the wearable device 200 may display frames obtained through the cameras 240-9 and 240-10 on each of the first display 250-1 and the second display 250-2. The wearable device 200 may be displayed through the first display 250-1 and the second display 250-2 and may provide the user with a user experience (e.g., video see-through (VST)) in which a real object and a virtual object are mixed by combining the virtual object in a frame including the real object. The wearable device 200 may change the virtual object based on information obtained by the cameras 240-1, 240-2, 240-3, 240-4, 240-5, 240-6, 240-7, 240-8, and/or the depth sensor 230. For example, in case that a visual object corresponding to the real object and the virtual object are at least partially overlapped in the frame, the wearable device 200 may stop displaying the virtual object based on detecting a motion for interacting with the real object. By stopping displaying the virtual object, the wearable device 200 may prevent the visibility of the real object from deteriorating as the visual object corresponding to the real object is occluded by the virtual object.

Figure 2C:
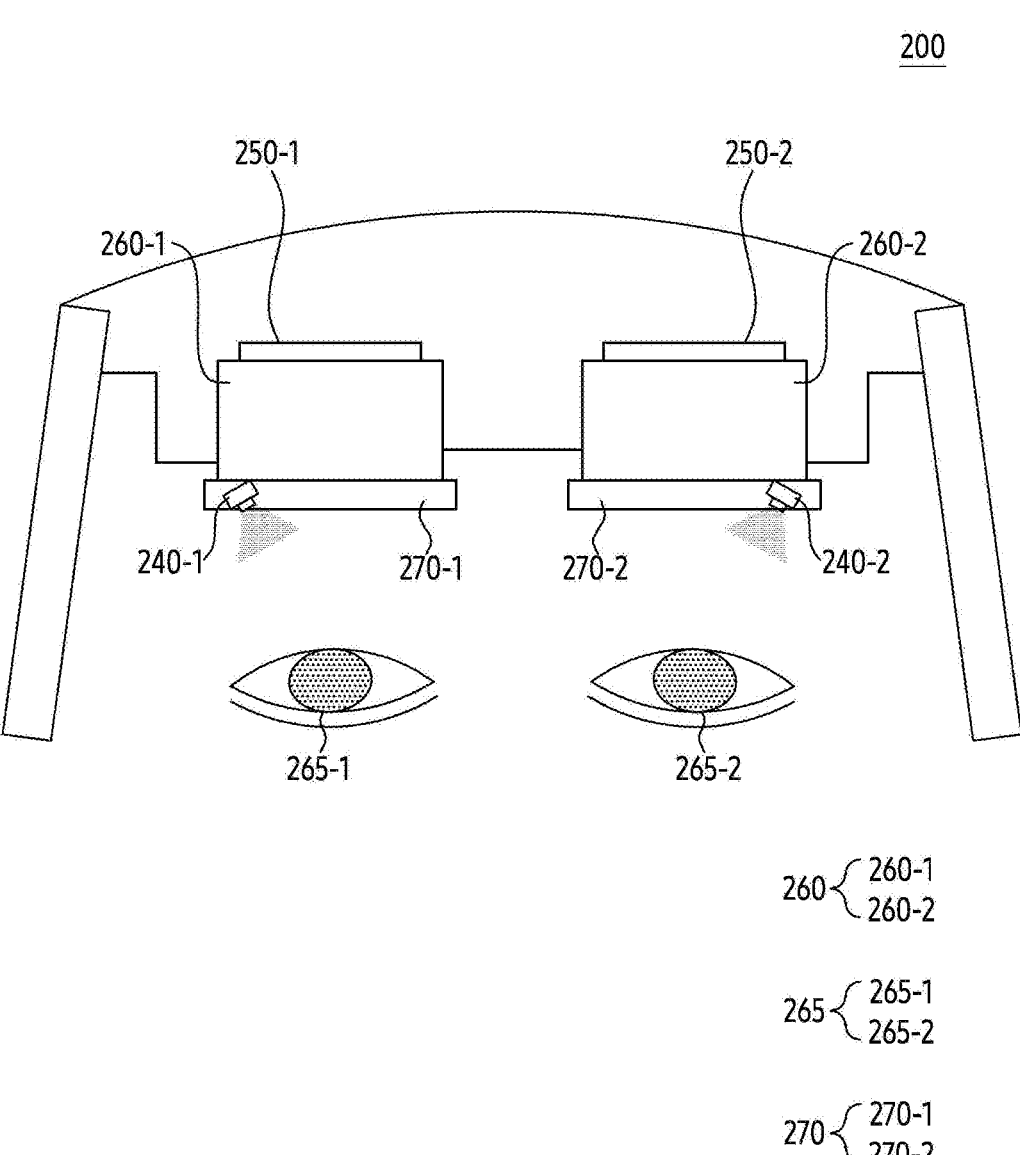
FIG. 2C illustrates a schematic example of a structure of a wearable device, according to an embodiment of the disclosure.
Figure 2D:
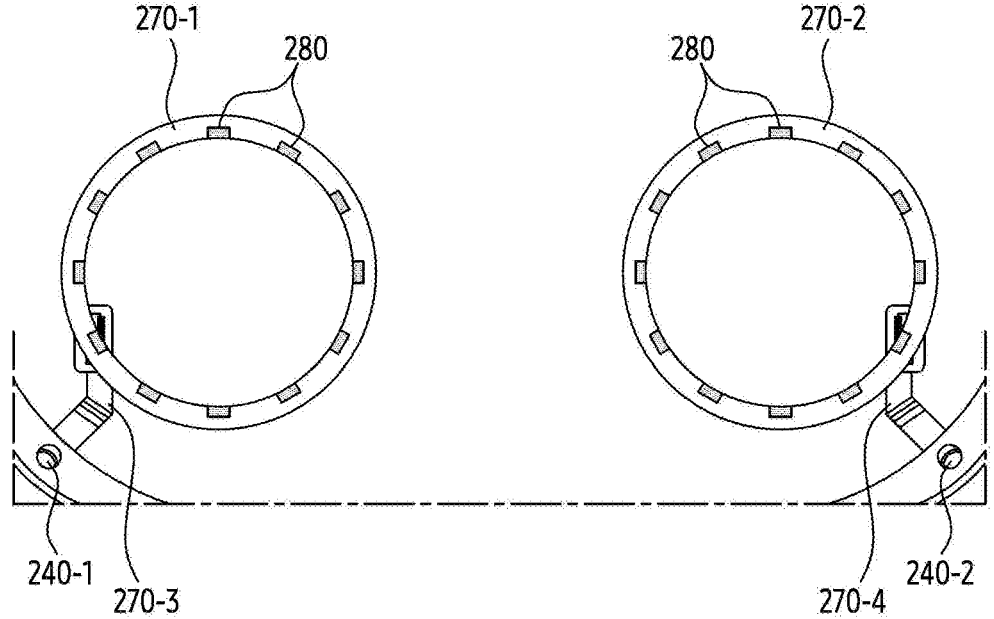
FIG. 2D illustrates a schematic example of a structure for eye tracking (ET) of a wearable device, according to an embodiment of the disclosure.

FIG. 2C illustrates a schematic example of a structure of a wearable device, according to an embodiment of the disclosure. FIG. 2D illustrates a schematic example of a structure for eye tracking (ET) of the wearable device, according to an embodiment of the disclosure.

Wearable device 200 of FIGS. 2C and 2D may be the electronic device 101 described in FIG. 1.

Referring to FIG. 2C, a wearable device 200 may include a lens assembly 260 including lens assemblies 260-1 and 260-2 adjacent to each of a first display 250-1 and a second display 250-2. The lens assemblies 260-1 and 260-2 may include one or more lenses.

The wearable device 200 may include structure 270 including structures 270-1 and 270-2 adjacent to each of the first display 250-1 and the second display 250-2.

Referring to FIG. 2D, each of structures 270-1 and 270-2 may include one or more light sources 280. For example, each of the structures 270-1 and 270-2 may have a circular structure. For example, any one surface of each of the structures 270-1 and 270-2 may have a circular structure. For example, a surface of each of the structures 270-1 and 270-2 facing both eyes 265-1 and 265-2 of a user may have a circular structure. However, it is not limited thereto. For example, each of the structures 270-1 and 270-2 may be polygonal, elliptical, or egg-shaped. For example, any one surface of each of the structures 270-1 and 270-2 may be polygonal, elliptical, or egg-shaped. For example, a surface of each of the structures 270-1 and 270-2 facing both eyes 265-1 and 265-2 of the user may be polygonal, elliptical, or egg-shaped. Each of the structures 270-1 and 270-2 may include a printed circuit board (PCB) or a flexible PCB (FPCB).

The wearable device 200 may include cameras 240-1 and 240-2 for photographing and/or tracking both eyes 265-1 and 265-2 of the user adjacent to each of the first display 250-1 and the second display 250-2. Each of the cameras 240-1 and 240-2 may be arranged in each of structures 270-3 and 270-4 of the structure 270. Each of the structures 270-3 and 270-4 may include the PCB or the FPCB. However, it is not limited thereto. Each of the cameras 240-1 and 240-2 may be arranged in each of the structures 270-1 and 270-2 in which the light sources 280 are arranged.

The light sources 280 may be arranged to be spaced apart from each other in each of the structures 270-1 and 270-2. The light sources 280 may be arranged to be spaced apart from each other at equal intervals in each of the structures 270-1 and 270-2. The light sources 280 may be arranged to be spaced apart from each other at an equal angle in each of the structures 270-1 and 270-2. Herein, the angle may be an angle formed by two neighboring light sources from a center point of the light sources 280 arranged in each of the structures 270-1 and 270-2. However, it is not limited thereto. For example, a portion of the light sources 280 may be arranged to be spaced apart from each other at different intervals in each of the structures 270-1 and 270-2. A portion of the light sources 280 may be arranged to be spaced apart from each other at a different angle in each of the structures 270-1 and 270-2.

Each of the cameras 240-1 and 240-2 may obtain an image while the light sources 280 arranged in each of the structures 270-1 and 270-2 emit light. The obtained image may include reflected light of light emitted by at least a portion of the light sources 280. For example, the camera 240-1 may obtain an image including reflected light of light of the light sources 280 while the light sources 280 arranged in the structure 270-1 emit light. For example, the camera 240-2 may obtain an image including reflected light of light of the light sources 280 while the light sources 280 arranged in the structure 270-2 emit light. Herein, the reflected light may be referred to as a glint. The image including reflected light of light of the light sources 280 may be referred to as a glint image.

The wearable device 200 may track the user's gaze based on the glint image. For example, the wearable device 200 may identify a position of an iris of both eyes 265-1 and 265-2 of the user, respectively, based on the glint image. For example, the wearable device 200 may track the user's gaze based on the position of the iris. However, it is not limited thereto.

Figure 2E:
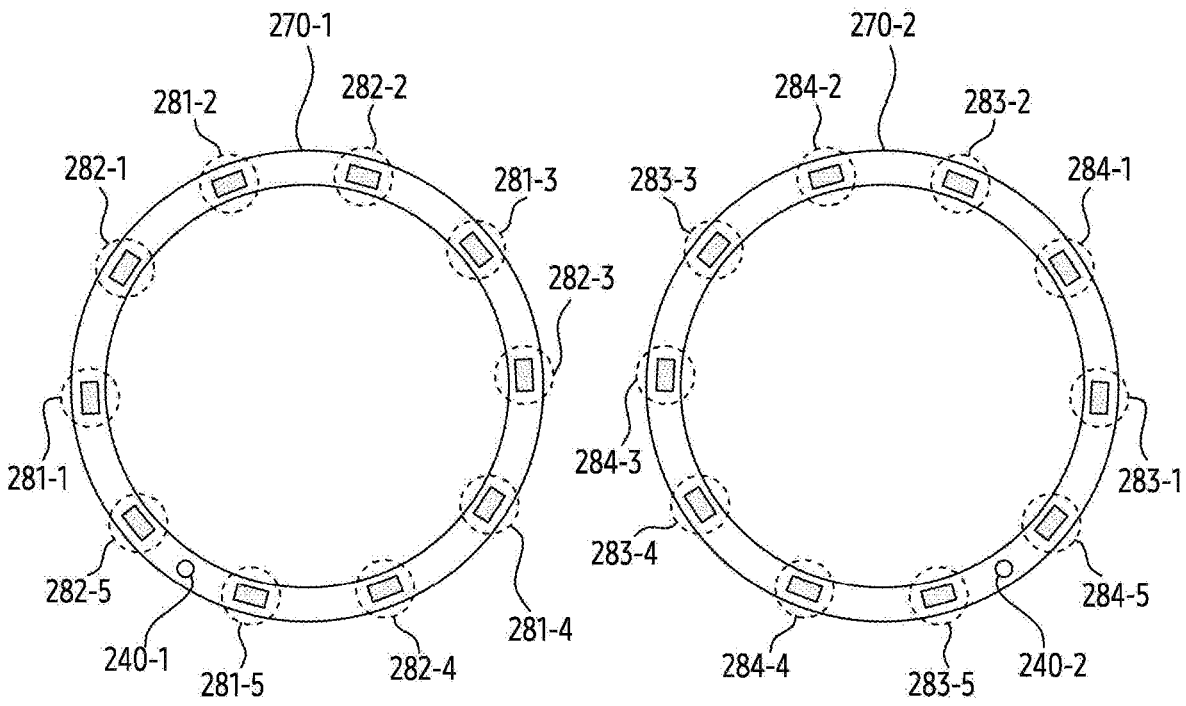
FIG. 2E illustrates a schematic example of a disposition structure of light sources of a wearable device, according to an embodiment of the disclosure.

FIG. 2E illustrates a schematic example of a disposition structure of light sources of a wearable device, according to an embodiment of the disclosure.

Wearable device 200 of FIG. 2E may be the electronic device 101 described in FIG. 1.

Referring to FIG. 2E, a surface of structures 270-1 and 270-2 facing both eyes 265-1 and 265-2 of a user may have a circular structure. However, it is not limited thereto.

A plurality of light sources 280 may be arranged in the structures 270-1 and 270-2. For example, the structure 270-1 may include 10 light sources 281-1, 281-2, 281-3, 281-4, 281-5, 282-1, 282-2, 282-3, 282-4, and 282-5. The structure 270-2 may include 10 light sources 283-1, 283-2, 283-3, 283-4, 283-5, 284-1, 284-2, 284-3, 284-4, and 284-5. However, it is not limited thereto. For example, a number of light sources 280 different from 10 may be arranged in each of the structures 270-1 and 270-2. For example, eight light sources 280 may be arranged in each of the structures 270-1 and 270-2.

The light sources 280 may be arranged to be spaced apart from each other in each of the structures 270-1 and 270-2. The light sources 280 may be arranged to be spaced apart from each other at equal intervals in each of the structures 270-1 and 270-2. The light sources 280 may be arranged to be spaced apart from each other at an equal angle in each of the structures 270-1 and 270-2. Herein, the angle may be an angle formed by two neighboring light sources from a center point of the light sources 280 arranged in each of the structures 270-1 and 270-2.

However, it is not limited thereto. For example, a portion of the light sources 280 may be arranged to be spaced apart from each other at different intervals in each of the structures 270-1 and 270-2. A portion of the light sources 280 may be arranged to be spaced apart from each other at a different angle in each of the structures 270-1 and 270-2.

The plurality of light sources 280 included in each of the structures 270-1 and 270-2 may be divided into two or more sets. For example, the plurality of light sources 280 included in the structure 270-1 may be divided into a first set of light sources 281 and a second set of light sources 282. For example, the plurality of light sources 280 included in the structure 270-2 may be divided into a third set of light sources 283 and a fourth set of light sources 284. However, it is not limited thereto.

Any set of light sources may be selected from among light sources 280 that are not adjacent to each other. For example, the first set of light sources 281 may be selected from among the light sources 280 that are not adjacent to each other. For example, light sources 281-1, 281-2, 281-3, 281-4, and 281-5 that are not adjacent to each other may be included in the first set of light sources 281. For example, the second set of light sources 282 may be selected from among the light sources 280 that are not adjacent to each other. For example, light sources 282-1, 282-2, 282-3, 282-4, and 282-5 that are not adjacent to each other may be included in the second set of light sources 282. For example, the third set of light sources 283 may be selected from among the light sources 280 that are not adjacent to each other. For example, light sources 283-1, 283-2, 283-3, 283-4, and 283-5 that are not adjacent to each other may be included in the third set of light sources 283. For example, the fourth set of light sources 284 may be selected from among the light sources 280 that are not adjacent to each other. For example, light sources 284-1, 284-2, 284-3, 284-4, and 284-5 that are not adjacent to each other may be included in the fourth set of light sources 284. However, it is not limited thereto. Any set of light sources may be selected from among light sources 280 of which a portion is adjacent to each other. Any set of light sources may be selected from among light sources 280 arranged adjacent to each other.

The wearable device 200 may use a specific set among two or more sets of each of the structures 270-1 and 270-2 for iris recognition. For example, the wearable device 200 may use the first set of light sources 281 among the first set of light sources 281 and the second set of light sources 282 for iris recognition with respect to the structure 270-1. For example, the wearable device 200 may use the third set of light sources 283 among the third set of light sources 283 and the fourth set of light sources 284 for iris recognition with respect to the structure 270-2. Hereinafter, a light source that may be used for iris recognition may be referred to as an iris light source.

The wearable device 200 may use a portion of the light sources included in a specific set among two or more sets of each of the structures 270-1 and 270-2 for iris recognition. For example, the wearable device 200 may use a designated number of light sources among light sources included in a specific set for iris recognition. Herein, the designated number may be 1 or more. For example, the wearable device 200 may use the light source 282-5 among the light sources 281-1, 281-2, 281-3, 281-4, and 281-5 included in the first set of light sources 281 for iris recognition. For example, the wearable device 200 may use the light source 283-5 among the light sources 283-1, 283-2, 283-3, 283-4, and 283-5 included in the third set of light sources 283 for iris recognition.

The wearable device 200 may use a light source disposed at a specific position among light sources included in a specific set among two or more sets of each of the structures 270-1 and 270-2 for iris recognition. For example, the wearable device 200 may use a light source adjacent to a camera 240 among light sources included in a specific set for iris recognition. For example, the wearable device 200 may use the light source 282-5 among the light sources 281-1, 281-2, 281-3, 281-4, and 281-5 included in the first set of light sources 281 for iris recognition. For example, the wearable device 200 may use the light source 283-5 among the light sources 283-1, 283-2, 283-3, 283-4, and 283-5 included in the third set of light sources 283 for iris recognition. However, it is not limited thereto. For example, the wearable device 200 may use a light source not adjacent to the camera 240 among light sources included in a specific set for iris recognition. For example, the wearable device 200 may use the light source 282-3 among the light sources 281-1, 281-2, 281-3, 281-4, and 281-5 included in the first set of light sources 281 for iris recognition. For example, the wearable device 200 may use the light source 283-3 among the light sources 283-1, 283-2, 283-3, 283-4, and 283-5 included in the third set of light sources 283 for iris recognition.

Figure 2F:
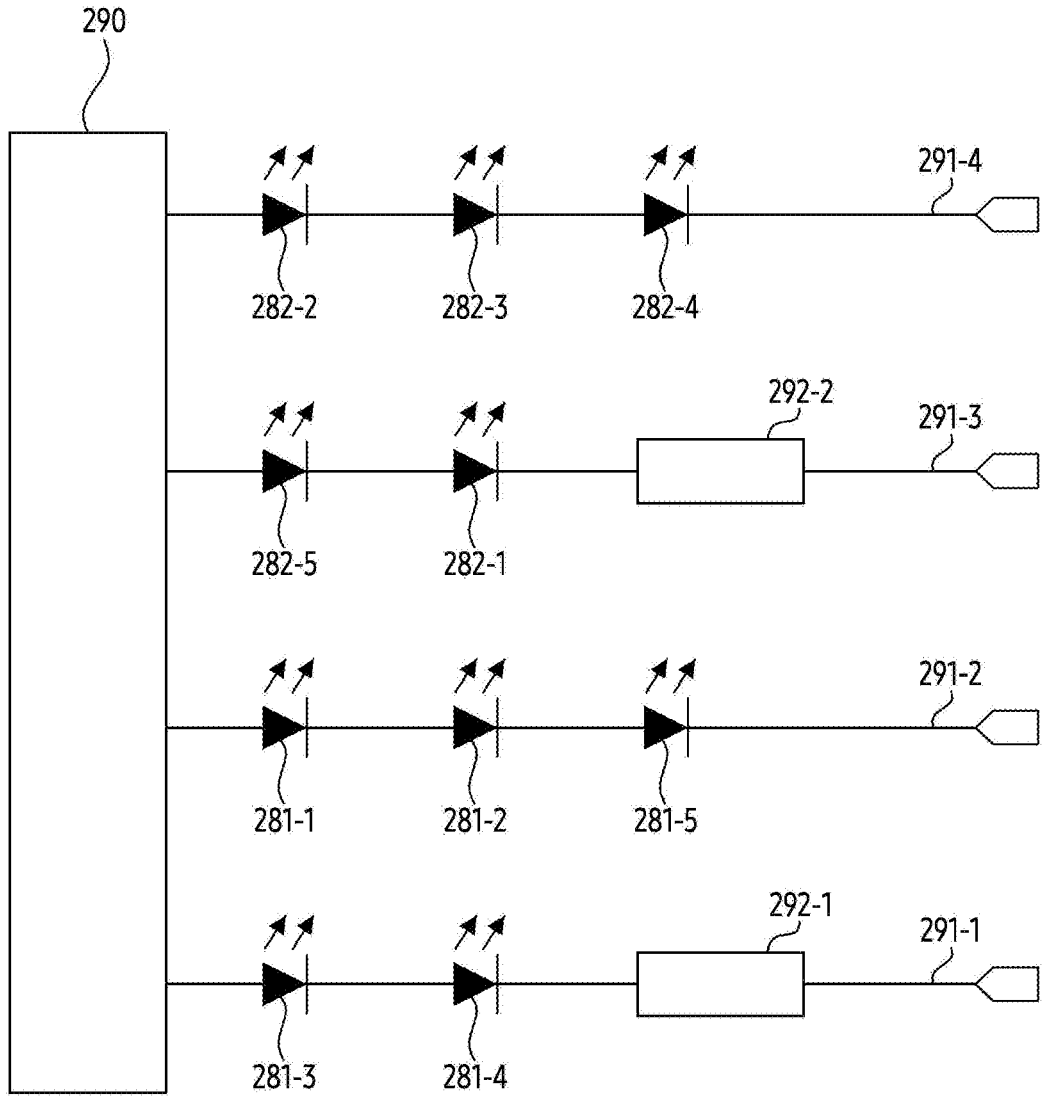
FIG. 2F illustrates a schematic example of a circuit structure of light sources of a wearable device, according to an embodiment of the disclosure.

FIG. 2F illustrates a schematic example of a circuit structure of light sources of a wearable device, according to an embodiment of the disclosure.

Wearable device 200 of FIG. 2F may be the electronic device 101 described in FIG. 1.

FIG. 2F illustrates a circuit structure of light sources 281-1, 281-2, 281-3, 281-4, 281-5, 282-1, 282-2, 282-3, 282-4, and 282-5 arranged in a structure 270-1 among light sources 280 of the wearable device 200. FIG. 2F illustrates the structure 270-1 with respect to a left eye 265-1. The same structure as the circuit structure illustrated in FIG. 2F may also be applied to a structure 270-2 with respect to a right eye 265-2, which is not illustrated.

A plurality of light sources 280 included in each of the structures 270-1 and 270-2 may be controlled by two or more channels. The plurality of light sources 280 included in each of the structures 270-1 and 270-2 may be supplied with power by two or more channels.

Referring to FIG. 2F, a plurality of light sources 280 included in structure 270-1 may be controlled by a light source driver 290. The light source driver 290 may have a plurality of output terminals. Herein, the output terminal may be referred to as a channel.

The light source driver 290 may control a plurality of output channels individually. For example, the light source driver 290 may individually supply power to the plurality of output channels. The light source driver 290 may individually control the plurality of output channels under the control of the processor 120. The light source driver 290 may control the light sources 280 included in the plurality of output channels to emit light based on a timing signal of a camera (e.g., camera 310 of FIG. 3A).

The plurality of light sources 280 included in the structure 270-1 may be controlled by four channels 291-1, 291-2, 291-3, and 291-4 of the light source driver 290. For example, a first channel 291-1 may include the light sources 281-3 and 281-4. A second channel 291-2 may include the light sources 281-1, 281-2, and 281-5. A third channel 291-3 may include the light sources 282-1 and 282-5. A fourth channel 291-4 may include the light sources 282-2, 282-3, and 282-4. The first channel and the second channel may include a first set of light sources 281. The third channel and the fourth channel may include a second set of light sources 282. Likewise, the plurality of light sources 280 included in the structure 270-2 may be controlled by four channels. However, it is not limited thereto. The number of channels may be less than four, or more than four.

A portion of the four channels 291-1, 291-2, 291-3, and 291-4 may include resistance components 292-1 and 292-2. For example, some channels may include the resistance components 292-1 and 292-2 so that the resistance of each of the four channels 291-1, 291-2, 291-3, and 291-4 is equalized. For example, the channels 291-1 and 291-3 may include the resistance components 292-1 and 292-2 so that the resistance of each of the channels 291-1 and 291-3 corresponds to the resistance of the other channels 291-2 and 291-4. For example, the first channel 291-1 may include the resistance component 292-1 such that the resistance of the first channel 291-1 corresponds to the resistance of the second channel 291-2. Herein, the resistance components 292-1 and 292-2 may have resistance for equalizing resistance of each of the four channels 291-1, 291-2, 291-3, and 291-4. For example, the resistance component 292-1 may correspond to a difference between the number of light sources 281-3 and 281-4 included in the first channel 291-1 and the number of light sources 281-1, 281-2, and 281-5 included in the second channel 291-2. For example, the resistance component 292-1 may have the same resistance as a resistance of one light source.

Each of the resistance components 292-1 and 292-2 may be a resistor having the same resistance as that of a light source. However, it is not limited thereto. For example, each of the resistance components 292-1 and 292-2 may be a wiring of a pattern configured to have the same resistance as that of a light source. For example, each of the resistance components 292-1 and 292-2 may have a structure different from that of the wiring in which the light sources 280 are disposed. For example, at least one of the wiring length, wiring width, or wiring shape of each of the resistance components 292-1 and 292-2 may be different from the wiring in which the light sources 280 are disposed.

The wearable device 200 may perform eye tracking or iris recognition by using a portion of a plurality of channels of each of the structures 270-1 and 270-2. For example, the wearable device 200 may control light sources included in a portion of the plurality of channels of each of the structures 270-1 and 270-2 to emit light. For example, the wearable device 200 may supply power to a portion of the plurality of channels of each of the structures 270-1 and 270-2.

Figure 3A:
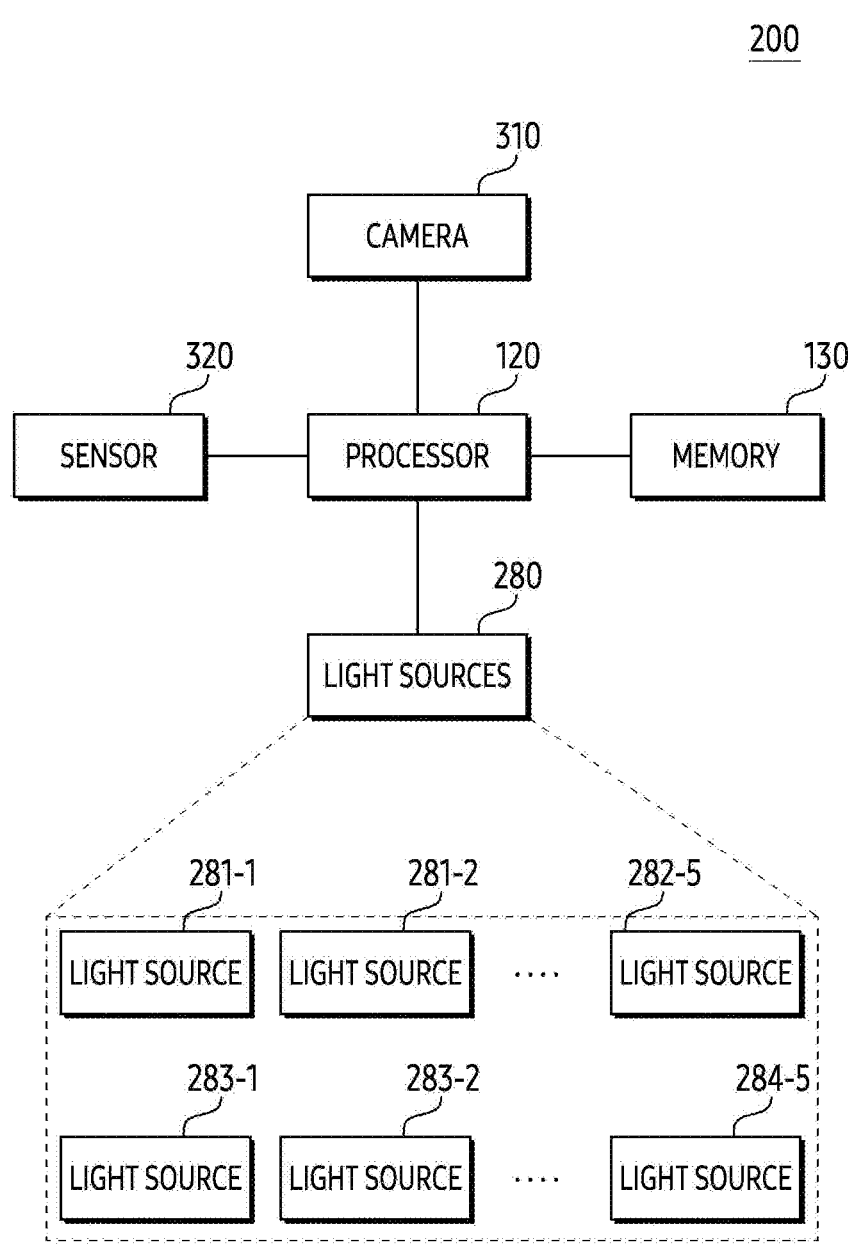
FIG. 3A is a simplified block diagram of a wearable device, according to an embodiment of the disclosure.
Figure 3B:
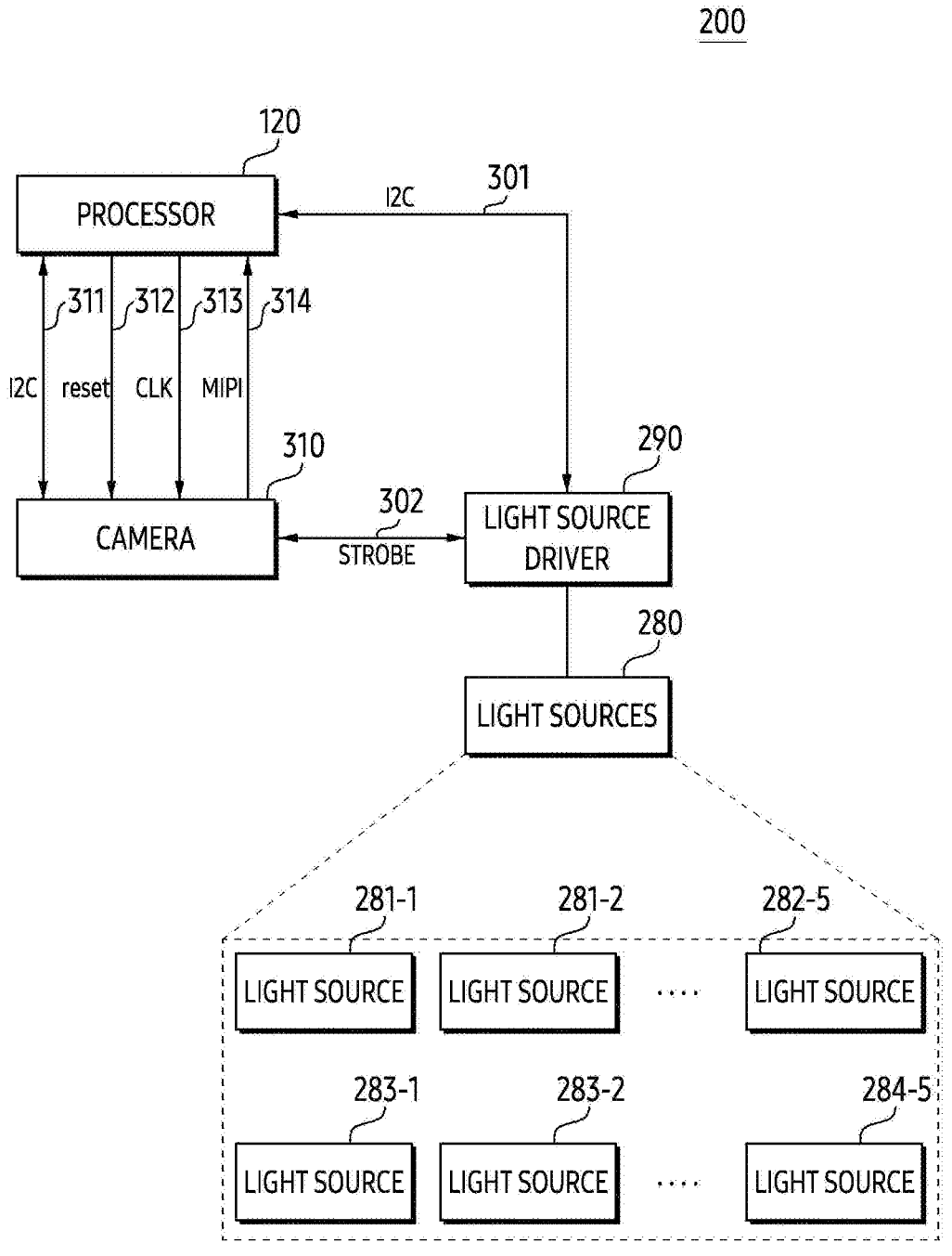
FIG. 3B is a simplified circuit diagram of a wearable device, according to an embodiment of the disclosure.

FIG. 3A is a simplified block diagram of a wearable device, according to an embodiment of the disclosure. FIG. 3B is a simplified circuit diagram of the wearable device, according to an embodiment of the disclosure.

The description of FIGS. 3A and 3B may refer to a component or structure of an electronic device 101 or a wearable device 200 described through FIGS. 1, 2A, 2B, 2C, 2D, 2E, and 2F.

Wearable device 200 of FIGS. 3A and 3B may be the electronic device 101 described in FIG. 1.

Referring to FIG. 3A, a wearable device 200 may include a processor 120, memory 130, light sources 280, a camera 310, and a sensor 320. For example, the light sources 280 may be light sources 280 of FIGS. 2D, 2E, and 2F. For example, the camera 310 may be included in a camera module 180 of FIG. 1. For example, the camera 310 may correspond to cameras 240-1 and 240-2 of FIGS. 2A, 2C, 2D, and 2E, respectively. For example, the sensor 320 may be included in the sensor module 176 of FIG. 1.

The light sources 280 may emit light. The light sources 280 may emit light of a designated frequency. For example, the light sources 280 may emit infrared light.

The light sources 280 may emit light toward an eye 265 of a user wearing the wearable device 200. The light sources 280 may be arranged to face the eye 265 of the user wearing the wearable device 200. For example, light sources 281-1, 281-2, 281-3, 281-4, 281-5, 282-1, 282-2, 282-3, 282-4, and 282-5 among the light sources 280 may be arranged to face a left eye 265-1 of the user. For example, light sources 283-1, 283-2, 283-3, 283-4, 283-5, 284-1, 284-2, 284-3, 284-4, and 284-5 among the light sources 280 may be arranged to face a right eye 265-2 of the user.

The light sources 280 may include a plurality of light sources. The plurality of light sources may emit light under the control of the processor 120. The light sources 281-1, 281-2, 281-3, 281-4, 281-5, 282-1, 282-2, 282-3, 282-4, and 282-5 may emit light under the control of the processor 120. The light sources 283-1, 283-2, 283-3, 283-4, 283-5, 284-1, 284-2, 284-3, 284-4, and 284-5 may emit light under the control of the processor 120.

For example, a portion of the plurality of light sources may emit light for eye tracking under the control of the processor 120. For example, the processor 120 may control light sources included in at least one set among a plurality of sets for the left eye 265-1 to emit light for eye tracking. For example, the processor 120 may control the light sources 281-1, 281-2, 281-3, 281-4, and 281-5 included in a first set among two sets for the left eye 265-1 to emit light for eye tracking. For example, the processor 120 may control light sources included in at least one channel among a plurality of channels for the left eye 265-1 to emit light for eye tracking. For example, the processor 120 may control the light sources 281-1, 281-2, 281-3, 281-4, and 281-5 included in a first channel and a second channel among four channels for the left eye 265-1 to emit light for eye tracking. For example, the processor 120 may control light sources included in at least one set among a plurality of sets for the right eye 265-2 to emit light for eye tracking. For example, the processor 120 may control light sources included in at least one channel among a plurality of channels for the right eye 265-2 to emit light for eye tracking.

For example, the processor 120 may perform eye tracking based on the images captured by the camera 310 while the plurality of light sources 280 are controlled to emit light toward the eye of the user.

For example, another portion of the plurality of light sources may emit light for iris recognition under the control of the processor 120. The other portion of the light source for iris recognition may emit light for iris recognition under the control of the processor 120. For example, the processor 120 may control a portion of the light sources included in at least one set among the plurality of sets for the left eye 265-1 to emit light for iris recognition. For example, the processor 120 may control a portion (e.g., the light source 281-5) among the light sources 281-1, 281-2, 281-3, 281-4, and 281-5 included in the first set among the two sets for the left eye 265-1 to emit light for iris recognition. For example, the processor 120 may control light sources included in at least one channel among the plurality of channels for the left eye 265-1 to emit light for iris recognition. For example, the processor 120 may control the light sources 281-3 and 281-4 included in the first channel among the four channels for the left eye 265-1 to emit light for iris recognition. For example, the processor 120 may control a portion among the light sources included in at least one set among the plurality of sets for the right eye 265-2 to emit light for iris recognition. For example, the processor 120 may control light sources included in at least one channel among the plurality of channels for the right eye 265-2 to emit light for iris recognition. Herein, the number of light sources included in at least one channel for iris recognition may be less than the number of light sources included in at least one channel for eye tracking.

For example, the processor 120 may perform iris recognition based on at least one image captured by the camera 310 while a portion of the plurality of light sources 280 is controlled to emit light toward the eye of the user and a remaining portion of the plurality of light sources 280 is deactivated. For example, the portion of the plurality of light sources 280 used to perform the iris recognition may correspond to a sub-set of the same light sources used for performing the eye tracking. For example, the number of light sources used for performing the iris recognition may be less than the number of light sources used for performing the eye tracking. For example, two light sources (or two or more light sources) among the light sources used for performing the eye tracking may be selected to perform the iris recognition. For example, among the light sources used for performing the eye tracking, only one thereof may be selected for performing the iris recognition.

Referring to FIG. 3B, the light sources 280 may be electrically connected to the processor 120 and/or the camera 310 through a light source driver 290. For example, the light sources 280 may be electrically connected to the light source driver 290 through an output terminal of the light source driver 290. For example, the light sources 280 may be electrically connected to the light source driver 290 through each of a plurality of channels of the light source driver 290.

The light source driver 290 may be electrically connected to the processor 120 through a communication path 301 based on an inter integrated circuit (I2C). However, it is not limited thereto. For example, the light source driver 290 may be electrically connected to the processor 120 through another interface. For example, the light source driver 290 may be electrically connected to the processor 120 through a bus, GPIO, SPI, or MIPI.

The light source driver 290 may be electrically connected to the camera 310. For example, the light source driver 290 may be electrically connected to the camera 310 through a communication path 302 based on the bus. However, it is not limited thereto. For example, the light source driver 290 may be electrically connected to the camera 310 through GPIO or SPI.

The light source driver 290 may obtain a designated signal from the camera 310. For example, the light source driver 290 may obtain a strobe signal of the camera 310. Herein, the strobe signal may indicate light emitting timing of the light sources 280. For example, the camera 310 may transmit the strobe signal to the light source driver 290 for synchronization between the light sources 280 and the camera 310 so that the light sources 280 emit light at the time to obtain an image.

The camera 310 may obtain an image including the eye 265 of the user wearing the wearable device 200. The camera 310 may capture images for at least a part of the eye 265 of the user wearing the wearable device 200. The camera 310 may obtain a glint image of the user wearing the wearable device 200. The camera 310 may obtain a glint image for eye tracking. The camera 310 may obtain an image for iris recognition.

The camera 310 may obtain an image under the control of the processor 120. For example, the camera 310 may obtain an image based on a command for obtaining an image of the processor 120. For example, the camera 310 may provide information related to the light emitting timing of the light sources 280 to the light sources 280 based on the command. For example, the camera 310 may obtain an image based on the light emitting timing. For example, the camera 310 may obtain an image while the light sources 280 emit light based on the light emitting timing. However, it is not limited thereto. For example, the processor 120 may provide information related to the light emitting timing to the light sources 280.

The camera 310 may be electrically connected to the processor 120 through a communication path 311 based on I2C. However, it is not limited thereto. For example, the camera 310 may be electrically connected to the processor 120 through the other interface. For example, the camera 310 may be electrically connected to the processor 120 through the bus, GPIO, SPI, or MIPI.

The camera 310 may obtain a designated signal from the processor 120. For example, the camera 310 may obtain an initialization signal (or a reset signal) from the processor 120. For example, the camera 310 may obtain the initialization signal (or the reset signal) from the processor 120 through a designated signal line 312. The camera 310 may be initialized based on the initialization signal (or the reset signal) from the processor 120. Herein, initializing of the camera 310 may mean rebooting of the camera 310.

The camera 310 may obtain a designated signal from the processor 120. For example, the camera 310 may obtain a synchronization signal (or a clock (CLK) signal) from the processor 120. For example, the camera 310 may obtain the synchronization signal (or the CLK signal) from the processor 120 through a designated signal line 313. An operation of the camera 310 may be synchronized with the processor 120 based on the synchronization signal (or the CLK signal) from the processor 120.

The camera 310 may be electrically connected to the processor 120 through a communication path 314 based on the MIPI. However, it is not limited thereto. For example, the camera 310 may be electrically connected to the processor 120 through the bus, GPIO, SPI, or I2C.

The camera 310 may transmit the obtained image to the processor 120 through the communication path 314 based on the MIPI.

The camera 310 may obtain a designated signal from the processor 120. For example, the camera 310 may obtain the synchronization signal (or the CLK signal) from the processor 120. For example, the camera 310 may obtain the synchronization signal (or the CLK signal) from the processor 120 through the designated signal line 313. The operation of the camera 310 may be synchronized with the processor 120 based on the synchronization signal (or the CLK signal) from the processor 120.

The sensor 320 may provide information to the processor 120. For example, the sensor 320 may provide environmental information around the wearable device 200 to the processor 120. For example, the sensor 320 may provide information for identifying a device coupled to the wearable device 200. For example, the sensor 320 may provide information for identifying another device worn by the user of the wearable device 200. Herein, the device coupled to the wearable device 200 or the other device worn by the user may include a lens. However, it is not limited thereto. Hereinafter, the device coupled to the wearable device 200 or the other device worn by the user may be referred to as an auxiliary device.

The sensor 320 may provide information related to the auxiliary device to the processor 120. For example, the sensor 320 may obtain readable information from the auxiliary device. The sensor 320 may provide information read from the auxiliary device to the processor 120. Herein, the readable information may be recorded on the auxiliary device through a designated method. For example, the readable information may be recorded through a barcode or a quick response (QR) code. However, it is not limited thereto. The sensor 320 may obtain information related to the auxiliary device based on near field communication (NFC). The readable information may be based on a physical characteristic of the lens. For example, the readable information may be identified based on a refractive index of the lens or power of the lens.

The processor 120 may obtain an input. The processor 120 may obtain an input for eye tracking. For example, the processor 120 may trigger eye tracking by a program 140 while the program 140 is being executed. For example, the processor 120 may obtain an eye tracking request generated by the program 140 while the program 140 is being executed. For example, the processor 120 may obtain execution of the designated program 140 as the input for eye tracking. For example, the processor 120 may obtain execution of a designated function as the input for eye tracking while the designated program 140 is being executed. However, it is not limited thereto. For example, the processor 120 may obtain a user input requesting eye tracking. For example, the processor 120 may obtain the fact that the user is wearing the wearable device 200 as the input for eye tracking.

The processor 120 may control the light sources 280 to emit light. The processor 120 may control the light sources 280 to emit light in response to the input for eye tracking.

The processor 120 may control two or more light sources among the light sources 280 to emit light. The processor 120 may control two or more light sources to emit light in response to the input for eye tracking. For example, in response to the input for eye tracking, the processor 120 may control two or more light sources to emit light through at least one channel (e.g., the channels 291-1 and 291-2) among a plurality of channels 291-1, 291-2, 291-3, and 291-4.

In response to the input for eye tracking, the processor 120 may control two or more light sources among the light sources 281-1, 281-2, 281-3, 281-4, 281-5, 282-1, 282-2, 282-3, 282-4, and 282-5 corresponding to the left eye 265-1 to emit light. In response to the input for eye tracking, the processor 120 may control two or more light sources among the light sources 283-1, 283-2, 283-3, 283-4, 283-5, 284-1, 284-2, 284-3, 284-4, and 284-5 corresponding to the right eye 265-2 to emit light.

The processor 120 may obtain an image for eye tracking. The processor 120 may obtain an image for eye tracking in response to the input for eye tracking. The processor 120 may obtain an image for eye tracking while the light sources 280 emit light. The processor 120 may obtain an image for eye tracking while the two or more light sources emit light.

In response to the input for eye tracking, the processor 120 may obtain an image for one eye among both eyes 265-1 and 265-2 of the user. The processor 120 may obtain an image for each of both eyes 265-1 and 265-2 of the user in response to the input for eye tracking. In response to the input for eye tracking, the processor 120 may sequentially obtain an image for each of both eyes 265-1 and 265-2 of the user. For example, in response to an input for eye tracking, the processor 120 may obtain an image corresponding to the left eye 265-1 and then obtain an image corresponding to the right eye 265-2. However, it is not limited thereto.

The processor 120 may identify gaze of the user. The processor 120 may track the gaze of the user. For example, the processor 120 may identify a position of an iris of each of both eyes 265-1 and 265-2 of the user based on an image for eye tracking. For example, the processor 120 may track the gaze of the user based on the position of the iris. However, it is not limited thereto. For example, the processor 120 may track the gaze of the user based on the position of the iris identified based on an image corresponding to one eye among both eyes 265-1 and 265-2 of the user.

The processor 120 may obtain an input. The processor 120 may obtain an input for iris recognition. For example, the processor 120 may obtain an iris recognition request generated by the program 140 while the program 140 is being executed. For example, the processor 120 may obtain a user authentication request by the program 140 as the iris recognition request. However, it is not limited thereto. For example, the processor 120 may obtain an input of the user requesting iris recognition.

The processor 120 may control the light sources 280 to emit light. The processor 120 may control the light sources 280 to emit light in response to the input for iris recognition.

The processor 120 may control at least one light source among the light sources 280 to emit light. The processor 120 may control at least one light source to emit light in response to the input for iris recognition. For example, in response to the input for iris recognition, the processor 120 may control at least one light source to emit light through at least one channel (e.g., the first channel 291-1) among the plurality of channels 291-1, 291-2, 291-3, and 291-4 for the left eye 265-1. For example, the processor 120 may control at least one light source to emit light through at least one channel among a plurality of channels (not illustrated) for the right eye 265-2 in response to the input for iris recognition.

The processor 120 may select at least one light source among the light sources 280 in response to the input for iris recognition. For example, the processor 120 may select at least one light source based on user information. For example, the processor 120 may select at least one light source used during previous iris recognition of the user. Herein, at least one light source used during previous iris recognition of the user may be at least one light source used when iris recognition is successful. For example, when the user attempts iris recognition for the first time, the processor 120 may select at least one predetermined light source. For example, the processor 120 may select at least one light source based on context information. For example, the processor 120 may select at least one light source designated by the program 140 that has requested iris recognition. The processor 120 may control at least one selected light source to emit light.

The processor 120 may control at least one light source among the light sources 281-1, 281-2, 281-3, 281-4, 281-5, 282-1, 282-2, 282-3, 282-4, and 282-5 corresponding to the left eye 265-1 to emit light in response to the input for iris recognition. In response to the input for iris recognition, the processor 120 may control at least one light source among the light sources 283-1, 283-2, 283-3, 283-4, 283-5, 284-1, 284-2, 284-3, 284-4, and 284-5 corresponding to the right eye 265-2 to emit light.

The processor 120 may obtain an image for iris recognition. The processor 120 may obtain an image for iris recognition in response to the input for iris recognition. The processor 120 may obtain an image for iris recognition while the light sources 280 emit light. The processor 120 may obtain an image for iris recognition while at least one light source emits light.

The processor 120 may obtain an image for one eye of both eyes 265-1 and 265-2 of the user in response to the input for iris recognition. The processor 120 may obtain an image for each of both eyes 265-1 and 265-2 of the user in response to the input for iris recognition. The processor 120 may sequentially obtain an image for each of both eyes 265-1 and 265-2 of the user in response to the input for iris recognition. For example, in response to the input for iris recognition, the processor 120 may obtain an image corresponding to the left eye 265-1 and then obtain an image corresponding to the right eye 265-2. However, it is not limited thereto.

The processor 120 may perform biometric authentication (or biometric identification). The processor 120 may perform iris recognition based on an image for iris recognition. For example, the processor 120 may perform iris recognition based on an iris image of the user included in the image for iris recognition. However, it is not limited thereto.

The processor 120 may obtain an input. The processor 120 may obtain an input for position information of the light sources 280. For example, the position information may indicate which light source each of a plurality of glints included in the glint image corresponds to.

For example, the processor 120 may obtain a position information request generated by the program 140 while the program 140 is being executed. For example, the processor 120 may obtain execution of the designated program 140 as an input for position information. However, it is not limited thereto. For example, the processor 120 may obtain the fact that a new user is wearing the wearable device 200 as the input for position information. Herein, the new user may mean a user who uses the wearable device 200 for which position information is not registered.

The processor 120 may control the light sources 280 to emit light at least two timings. The processor 120 may control the light sources 280 to emit light at least two timings in response to the input for position information. For example, the processor 120 may control a portion of the light sources 280 to emit light at a first timing in response to the input for position information. For example, the processor 120 may control another portion of the light sources 280 to emit light at a second timing in response to the input for position information. Herein, the light sources emitting light at the first timing and the light sources emitting light at the second timing may not overlap each other.

The processor 120 may control the plurality of channels 291-1, 291-2, 291-3, and 291-4 to emit light at least two timings in response to the input for position information. For example, the processor 120 may control a portion of the plurality of channels 291-1, 291-2, 291-3, and 291-4 to emit light at the first timing in response to the input for position information. For example, the processor 120 may control another portion of the plurality of channels 291-1, 291-2, 291-3, and 291-4 to emit light at the second timing in response to the input for position information. Herein, the channels of the light sources emitting light at the first timing and the channels of the light sources emitting light at the second timing may not overlap each other.

The processor 120 may obtain an image for position information at each of at least two timings. The processor 120 may obtain an image for position information at each of at least two timings in response to the input for position information.

The processor 120 may identify position information. For example, the processor 120 may identify a positional relationship of each of the light sources 280 based on an image for position information.

Hereinafter, an operation performed by the wearable device 200 for eye tracking and iris recognition will be described.

Hereinafter, an operation in which the wearable device 200 performs eye tracking and iris recognition based on a plurality of cameras will be described.

The camera 310 may include a plurality of cameras. The camera 310 may include a plurality of cameras for each of the structures 270-1 and 270-2. The camera 310 may include a plurality of cameras for obtaining an image based on the light sources 280 arranged in each of the structures 270-1 and 270-2. At least two cameras among the plurality of cameras may be arranged in structures that are symmetrical with respect to a center point of each of the structures 270-1 and 270-2 in which the plurality of light sources 280 are arranged. At least two cameras of the plurality of cameras may be arranged in structures positioned in specific portions of each of the structures 270-1 and 270-2 in which the plurality of light sources 280 are arranged. For example, at least two cameras of the plurality of cameras may be arranged in a structure positioned below the iris of the eye 265 of the user. However, it is not limited thereto.

Each of the plurality of cameras may obtain an image under the control of the processor 120. Each of the plurality of cameras may obtain an image including the eye 265 of the user wearing the wearable device 200. Each of the plurality of cameras may be used for eye tracking. Each of the plurality of cameras may be used for iris recognition. Each of the plurality of cameras may be used for either eye tracking or iris recognition. However, it is not limited thereto.

The processor 120 may obtain an image for eye tracking based on a first camera among the plurality of cameras. The processor 120 may obtain the image for eye tracking based on the first camera among the plurality of cameras arranged with respect to the left eye 265-1. The processor 120 may obtain the image for eye tracking based on the first camera among the plurality of cameras arranged with respect to the right eye 265-2. The processor 120 may obtain the image for eye tracking based on the first camera arranged with respect to the left eye 265-1 and the first camera arranged with respect to the right eye 265-2. The processor 120 may obtain the image for eye tracking based on the first camera among the plurality of cameras based on the input for eye tracking.

The processor 120 may obtain an image for iris recognition based on a second camera among the plurality of cameras. The processor 120 may obtain the image for iris recognition based on the second camera among the plurality of cameras arranged with respect to the left eye 265-1. The processor 120 may obtain the image for iris recognition based on the second camera among the plurality of cameras arranged with respect to the right eye 265-2. The processor 120 may obtain the image for iris recognition based on the second camera arranged with respect to the left eye 265-1 and the second camera arranged with respect to the right eye 265-2. The processor 120 may obtain the image for iris recognition based on the second camera among the plurality of cameras based on the input for iris recognition.

Hereinafter, an operation of the wearable device 200 to select light sources for iris recognition will be described.

The processor 120 may select a portion of the light sources 280. The processor 120 may select a portion of the light sources 280 in response to the input for the iris recognition. For example, the processor 120 may select at least one light source based on user information. For example, the processor 120 may select some light sources used during previous iris recognition of the user. Herein, some light sources used during previous iris recognition of the user may be a light source used when iris recognition is successful. For example, when the user first attempts iris recognition, the processor 120 may select a predetermined light source. For example, the processor 120 may select a light source based on context information. For example, the processor 120 may select a light source designated by the program 140 that has requested iris recognition.

The processor 120 may control some light sources to emit light. The processor 120 may control some light sources to emit light in response to the input for the iris recognition. The processor 120 may control some selected light sources to emit light in response to the input for the iris recognition.

The processor 120 may obtain an image for iris recognition through the camera 310 while some light sources emit light. The processor 120 may perform the iris recognition based on the image obtained while some light sources emit light. The processor 120 may determine whether to re-obtain the image for the iris recognition in response to the iris recognition result based on the image obtained while a first light source emits light.

The processor 120 may select another portion of the light sources 280 in response to the iris recognition result based on the image obtained while some light sources emit light. The processor 120 may select another portion of the light sources 280 in response to failure of the iris recognition based on the image obtained while some light sources emit light. Herein, some other light sources may be selected based on user information. For example, some other light sources may be another light source used when previous iris recognition was successful. For example, some other light sources may be another light source designated by the program 140. Herein, some other light sources may be different light sources from some light sources. However, it is not limited thereto. Some other light sources may include some light sources. The number of some light sources may be different from the number of the some other light sources. The some light sources may be arranged to be adjacent to the camera 310 than the some other light sources. However, it is not limited thereto. The some other light sources may be arranged to be adjacent to the camera 310 than the some light sources.

The processor 120 may obtain an image for iris recognition through the camera 310 while some other light sources emit light. The processor 120 may perform the iris recognition based on the image obtained while some other light sources emit light. The processor 120 may determine whether to re-obtain the image for the iris recognition in response to the iris recognition result based on the image obtained while some other light sources emit light.

Hereinafter, an operation of the wearable device 200 to select light sources for iris recognition based on the surrounding environment will be described.

The processor 120 may determine whether a device other than the wearable device 200 is identified between the wearable device 200 and the eye of the user based on information obtained through the sensor 320. The processor 120 may determine whether an additional device is identified between the wearable device 200 and the eye of the user based on the information obtained through the sensor 320. Herein, the additional device may include a lens. Hereinafter, the lens included in the additional device may be referred to as an additional lens. Herein, the information obtained through the sensor 320 may be recorded in the additional device through a designated method. For example, the information obtained through the sensor 320 may be recorded through a barcode or a quick response (QR) code. The information obtained through the sensor 320 may indicate a physical characteristic of the lens. For example, the information obtained through the sensor 320 may indicate a refractive index of the lens or power of the lens.

The processor 120 may control a portion of the light sources 280 to emit light in response to the input for the iris recognition. In response to the input for the iris recognition, the processor 120 may control a selected portion of the light sources 280 to emit light according to whether the additional lens of the additional device is identified.

Based on the identification of the additional lens, the processor 120 may control at least one light source among the light sources 280 to emit light in response to the input for the iris recognition of the eye. In case that the additional lens is identified, the processor 120 may control at least one light source among the light sources 280 to emit light in response to the input for the iris recognition of the eye. The processor 120 may control at least one light source among the light sources 280 to emit light in response to the input for the iris recognition of the eye while the additional lens is identified.

Based on the identification of the additional lens, the processor 120 may select at least one light source among the light sources 280 based on the information obtained through the sensor 320. The processor 120 may control the selected at least one light source to emit light. Herein, the selection of the at least one light source may be a light source indicated by the information obtained through the sensor 320. For example, the processor 120 may select at least one light source corresponding to a physical characteristic indicated by the additional lens by the information obtained through the sensor 320 among the light sources 280. For example, the processor 120 may select at least one light source corresponding to a refractive index of the lens and/or power of the lens indicated by the additional lens by the information obtained through the sensor 320 among the light sources 280. Herein, the fact that at least one light source corresponds to the refractive index of the lens and/or the power of the lens indicated by the additional lens may mean that the at least one light source is predetermined to obtain an image for the iris recognition.

The processor 120 may obtain the image for the iris recognition through the camera 310 while the at least one light source emits light. Based on the identification of the additional lens, the processor 120 may obtain the image for the iris recognition through the camera 310 while the at least one light source emits light. In case that the additional lens is identified, the processor 120 may obtain the image for the iris recognition through the camera 310 while the at least one light source emits light. The processor 120 may obtain the image for the iris recognition through the camera 310 while the at least one light source emits light while the additional lens is identified.

Based on the identification of the additional lens, the processor 120 may perform the iris recognition based on the obtained image in response to the input for the iris recognition of the eye. Based on the identification of the additional lens, the processor 120 may stop eye tracking based on the obtained image in response to the input for the iris recognition of the eye. Herein, stopping eye tracking may mean that the processor 120 performs the iris recognition based on the obtained image and does not perform eye tracking in response to the input for the iris recognition of the eye based on the identification of the additional lens. Stopping eye tracking may include the processor 120 performing eye tracking again after successful iris recognition based on the image obtained based on the identification of the additional lens.

Based on the fact that the additional lens is not identified, the processor 120 may control two or more light sources among the light sources 280 to emit light in response to the input for the iris recognition of the eye. In case that the additional lens is not identified, the processor 120 may control two or more light sources among the light sources 280 to emit light in response to the input for the iris recognition of the eye. The processor 120 may control two or more light sources among the light sources 280 to emit light in response to the input for the iris recognition of the eye while the additional lens is not identified.

The processor 120 may obtain the image for the iris recognition through the camera 310 while the two or more light sources emit light. Based on the fact that the additional lens is not identified, the processor 120 may obtain the image for the iris recognition through the camera 310 while the two or more light sources emit light. In case that the additional lens is not identified, the processor 120 may obtain the image for the iris recognition through the camera 310 while the two or more light sources emit light. The processor 120 may obtain the image for the iris recognition through the camera 310 while the two or more light sources emit light while the additional lens is not identified.

The processor 120 may perform the iris recognition based on the obtained image based on the fact that the additional lens is not identified. Based on the fact that the additional lens is not identified, the processor 120 may perform the iris recognition based on the obtained image in response to the input for the iris recognition of the eye. Based on the fact that the additional lens is not identified, the processor 120 may perform eye tracking based on the obtained image in response to the input for the iris recognition of the eye. Herein, performing eye tracking may mean that the processor 120 performs the iris recognition based on the obtained image and eye tracking in response to the input for the iris recognition of the eye based on the fact that the additional lens is not identified. Performing eye tracking may include the processor 120 stopping the iris recognition after successful iris recognition based on the image obtained based on the identification of the additional lens.

Hereinafter, an operation of the wearable device 200 to perform iris recognition during eye tracking will be described.

The processor 120 may control the light sources 280 to emit light in response to the input for eye tracking. The processor 120 may control two or more light sources 280 to emit light in response to the input for eye tracking.

The processor 120 may obtain an image for eye tracking. The processor 120 may obtain an image for eye tracking in response to the input for eye tracking. The processor 120 may obtain an image for eye tracking while the light sources 280 emit light. The processor 120 may obtain an image for eye tracking while the two or more light sources emit light.

The processor 120 may identify the gaze of the user. The processor 120 may track the gaze of the user. For example, the processor 120 may identify a position of the iris of each of both eyes 265-1 and 265-2 of the user based on the image for eye tracking. For example, the processor 120 may track the gaze of the user based on the position of the iris. However, it is not limited thereto.

The processor 120 may obtain an input for iris recognition. The processor 120 may obtain the input for the iris recognition during eye tracking. Herein, during eye tracking, the processor 120 may include a time to identify the gaze of the user based on an image obtained in response to the input for eye tracking. During eye tracking, the processor 120 may include a time to sequentially identify the gaze of the user based on the images sequentially obtained in response to the input for eye tracking.

The processor 120 may perform iris recognition based on an image for eye tracking obtained while two or more light sources emit light.

The processor 120 may determine whether to re-obtain the image for the iris recognition during the eye tracking based on the result of iris recognition based on the image for eye tracking obtained while two or more light sources emit light.

In response to determining not to stop the eye tracking, the processor 120 may perform iris recognition by using at least one other light source that is different from the two or more light sources. Herein, the at least one other light source may not be included in the two or more light sources. However, it is not limited thereto. For example, the at least one other light source may be a portion of the two or more light sources.

The processor 120 may perform iris recognition by using at least one light source that is different from the two or more light sources based on the result of iris recognition based on the image for eye tracking obtained while the two or more light sources emit light. In response to the failure of iris recognition based on the image for eye tracking obtained while the two or more light sources emit light, the processor 120 may perform iris recognition by using a light source different from the two or more light sources. However, it is not limited thereto. The processor 120 may perform iris recognition by using a portion among the two or more light sources in response to the failure of iris recognition based on the image for eye tracking obtained while the two or more light sources emit light.

For example, the processor 120 may turn off a portion among the two or more light sources in response to determining to perform the iris recognition during the eye tracking. In response to determining to perform the iris recognition during the eye tracking, the processor 120 may obtain the image for eye tracking in a state in which a portion of the two or more light sources are turned off. Herein, some light sources to turn off may be selected based on user information. For example, some light sources to turn off may be a light source that was not used when previous iris recognition was successful. For example, some light sources to turn off may be a light source that was not used when iris recognition was successful during previous eye tracking. For example, some light sources to turn off may be other light sources designated by the program 140.

In response to determining to stop the eye tracking, the processor 120 may perform iris recognition by using at least one light source. Herein, the at least one light source may be a light source used when previous iris recognition was successful. However, it is not limited thereto.

For example, the processor 120 may perform iris recognition by using at least one light source in response to determining not to perform the iris recognition during the eye tracking. In response to determining not to perform the iris recognition during the eye tracking, the processor 120 may obtain the image for iris recognition by using at least one light source.

Figure 4A:
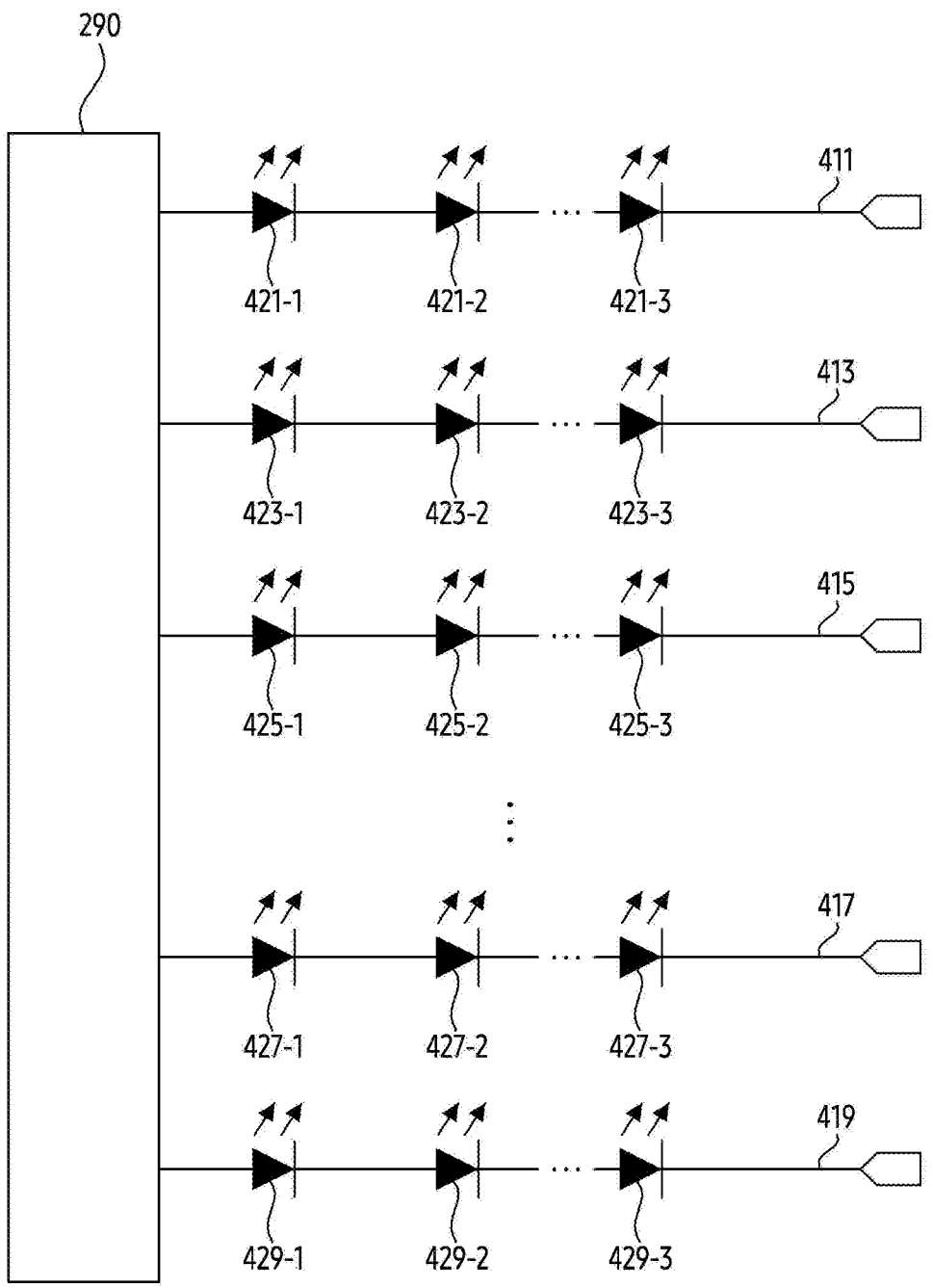
FIG. 4A illustrates a schematic example of a circuit structure of light sources of a wearable device, according to an embodiment of the disclosure.

FIG. 4A illustrates a schematic example of a circuit structure of light sources of a wearable device, according to an embodiment of the disclosure.

The description of FIG. 4A may refer to a component or structure of an electronic device 101 or a wearable device 200 described through FIGS. 1, 2A, 2B, 2C, 2D, 2E, 2F, 3A, and 3B.

FIG. 4A illustrates a circuit structure of light sources arranged in structures, according to an embodiment of the disclosure.

Referring to FIG. 4A, a plurality of light sources 421-1, 421-2, 421-3, 423-1, 423-2, 423-3, 425-1, 425-2, 425-3, 427-1, 427-2, 427-3, 429-1, 429-2, and 429-3 included in each of structures 270-1 and 270-2 may be arranged in equal numbers in output channels 411, 413, 415, 417, and 419. An equal number of light sources may be included in a plurality of output channels 411, 413, 415, 417, and 419 of FIG. 4A compared to output channels 291-1, 291-2, 291-3, and 291-4 of FIG. 2F.

Compared to the output channels 291-1, 291-2, 291-3, and 291-4 of FIG. 2F, a resistance component may not be included in the plurality of output channels 411, 413, 415, 417, and 419 of FIG. 4A. Since the equal number of light sources are included in the plurality of output channels 411, 413, 415, 417, and 419, a resistance component may not be included.

The light source driver 290 may control the output channels 411, 413, 415, 417, and 419. The light source driver 290 may individually control the plurality of output channels 411, 413, 415, 417, and 419. For example, the light source driver 290 may individually supply power to the plurality of output channels 411, 413, 415, 417, and 419.

The light source driver 290 may individually control the plurality of output channels 411, 413, 415, 417, and 419 under the control of the processor 120. The light source driver 290 may individually control power supply to each of the plurality of output channels 411, 413, 415, 417, and 419 under the control of the processor 120. The light source driver 290 may control the light sources 421-1, 421-2, 421-3, 423-1, 423-2, 423-3, 423-3, 425-1, 425-2, 425-3, 427-1, 427-2, 427-3, 429-1, 429-2, and 429-3 included in the plurality of output channels 411, 413, 415, 417, and 419 to emit light based on a timing signal of a camera 310.

The wearable device 200 may perform eye tracking or iris recognition by using a portion among the plurality of output channels 411, 413, 415, 417, and 419. For example, the wearable device 200 may perform eye tracking by using a greater number of output channels than the number of output channels for iris recognition. For example, the wearable device 200 may perform eye tracking by using output channels including an output channel for iris recognition. For example, the wearable device 200 may perform eye tracking by using another output channel that is divided from the output channel for iris recognition.

The wearable device 200 may perform iris recognition by using an output channel selected from among the plurality of output channels 411, 413, 415, 417, and 419. For example, the wearable device 200 may perform iris recognition by using an output channel selected based on the iris recognition result. For example, the wearable device 200 may perform iris recognition by using an output channel selected based on user information. For example, the wearable device 200 may perform iris recognition by using an output channel selected based on the surrounding environment.

Figure 4B:
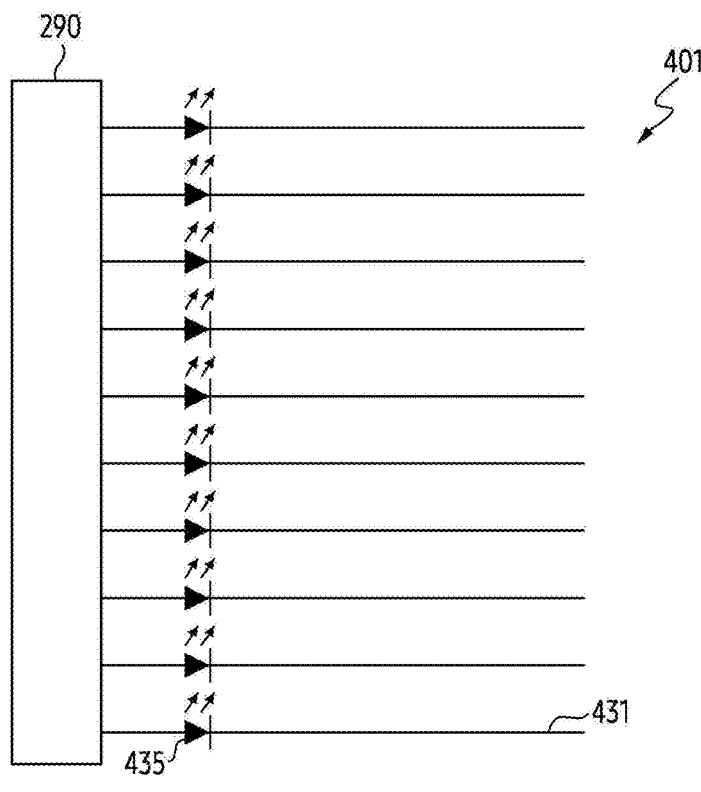
FIG. 4B illustrates a schematic example of a circuit structure of light sources of a wearable device, according to an embodiment of the disclosure.
Figure 4B:
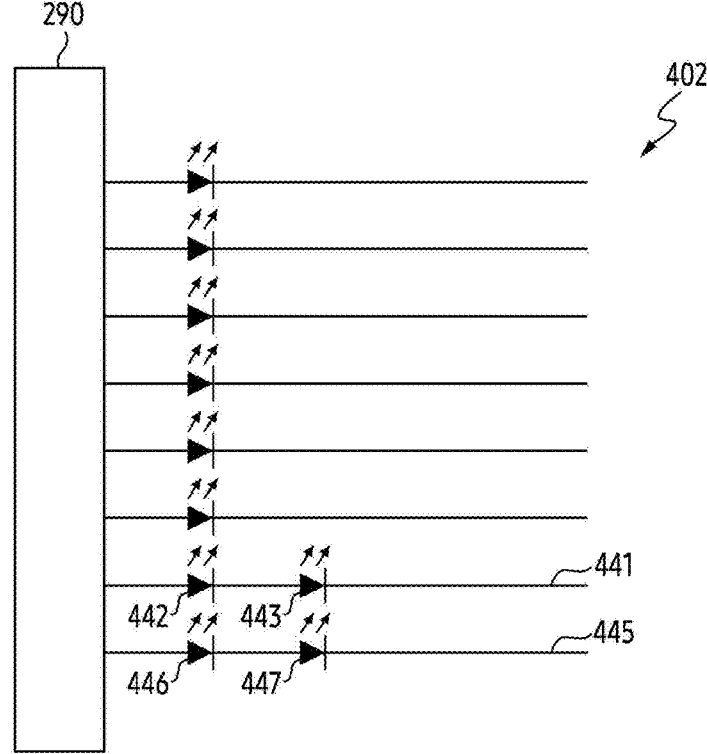

FIG. 4B illustrates a schematic example of a circuit structure of light sources of a wearable device, according to an embodiment of the disclosure.

The description of FIG. 4B may refer to a component or structure of an electronic device 101 or a wearable device 200 described through FIGS. 1, 2A, 2B, 2C, 2D, 2E, 2F, 3A, and 3B.

Circuit structures 401 and 402 of FIG. 4B illustrate a circuit structure of light sources arranged in each of structures 270-1 and 270-2.

Referring to the circuit structure 401 of FIG. 4B, an equal number of light sources may be arranged in each of a plurality of channels of a light source driver 290. For example, one light source may be arranged in each of the plurality of channels of the light source driver 290.

Processor 120 may perform iris recognition of a user based on a light source 435 arranged in one channel 431 among the 10 channels of the circuit structure 401. The processor 120 may perform iris recognition of the user based on a light source arranged in other one channel in response to the iris recognition result based on the light source 435 arranged in one channel 431 among the 10 channels of the circuit structure 401. For example, the processor 120 may select the other one channel among the 10 channels in response to the failure of the iris recognition based on the light source 435 arranged in one channel 431 among the 10 channels of the circuit structure 401. The processor 120 may perform iris recognition of the user based on the light source arranged in the selected other one channel. However, it is not limited thereto. For example, the processor 120 may perform iris recognition of the user based on light sources included in a designated number of channels among the 10 channels of the circuit structure 401. The processor 120 may perform iris recognition of the user based on the light sources in a designated number of other channels in response to the iris recognition result based on the light sources included in the designated number of channels of the circuit structure 401. Herein, the designated number of other channels may be divided from the designated number of channels. However, it is not limited thereto. A portion of the designated number of other channels may be included in the designated number of channels.

Referring to the circuit structure 402 of FIG. 4B, an uneven number of light sources may be arranged in each of the plurality of channels of the light source driver 290. For example, one or more light sources may be arranged in each of the plurality of channels of the light source driver 290.

The processor 120 may perform iris recognition of the user based on light sources 442, 443, 446, and 447 arranged in two channels 441 and 445 among the eight channels of the circuit structure 402. The processor 120 may perform iris recognition of the user based on light sources 446 and 447 arranged in other one channel 445 in response to the iris recognition result based on the light sources 442 and 443 arranged in one channel 441 among the eight channels. For example, the processor 120 may sequentially perform iris recognition based on the channels 441 and 445 for iris recognition. For example, the processor 120 may select the other one channel 445 among the eight channels in response to the failure of the iris recognition based on the light sources 442 and 443 arranged in one channel 441 among the eight channels of the circuit structure 402. The processor 120 may perform iris recognition of the user based on the light sources 446 and 447 arranged in the selected other one channel 445. However, it is not limited thereto.

Among the eight channels of the circuit structure 402, each of the remaining six channels except for the two channels 441 and 445 may include a resistance component.

Figure 5A:
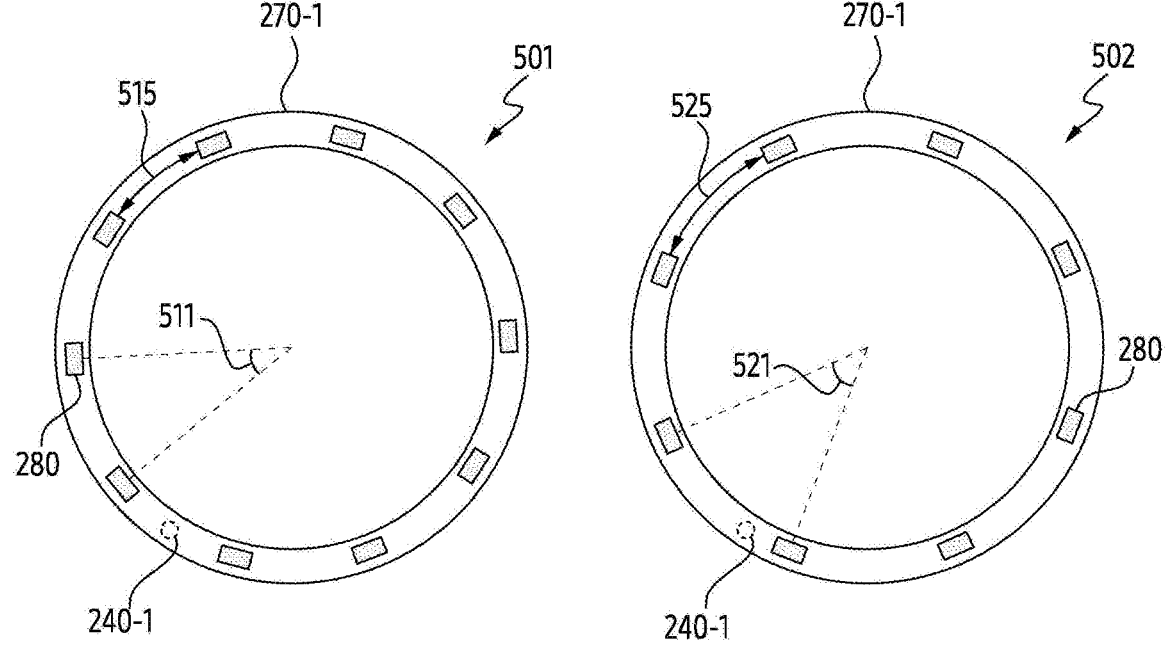
FIG. 5A illustrates a schematic example of a disposition structure of light sources of a wearable device, according to an embodiment of the disclosure.

FIG. 5A illustrates a schematic example of a disposition structure of light sources of a wearable device, according to an embodiment of the disclosure.

The description of FIG. 5A may refer to a component or structure of an electronic device 101 or a wearable device 200 described through FIGS. 1, 2A, 2B, 2C, 2D, 2E, 2F, 3A, and 3B.

Referring to FIG. 5A, a structure 270-1 for a left eye 265-1 is illustrated. The same structure as a circuit structure illustrated in FIG. 5A may also be applied to a structure 270-2 for a right eye 265-2 which is not illustrated. Herein, applying the same structure to the structure 270-2 may mean that the structure 270-2 and the structure 270-1 are mirror images with respect to each other. Applying the same structure to the structure 270-2 may mean that the structure 270-2 and the structure 270-1 are symmetrical to each other.

Referring to disposition structures 501 and 502 of FIG. 5A, the structure 270-1 for the left eye 265-1 may be circular. Referring to the disposition structures 501 and 502, light sources 280 may be equally arranged in the structure 270-1 for the left eye 265-1.

Referring to the disposition structure 501, the light sources 280 of the structure 270-1 for the left eye 265-1 may be arranged at an angle 511 equal to each other. Herein, the angle 511 may be an angle formed by two neighboring light sources from a center point of the light sources 280 arranged in the structure 270-1.

Referring to the disposition structure 501, the light sources 280 of the structure 270-1 for the left eye 265-1 may be arranged in a gap 515 that is equal to each other. Herein, the gap 515 may be a distance between two neighboring light sources among the light sources 280 arranged in the structure 270-1.

Referring to the disposition structure 502, compared to the disposition structure 501, a smaller number of light sources 280 may be arranged in the structure 270-1. In the disposition structure 502, the light sources 280 of the structure 270-1 for the left eye 265-1 may be arranged at an angle 521 equal to each other or in a gap 525 equal to each other.

Figure 5B:
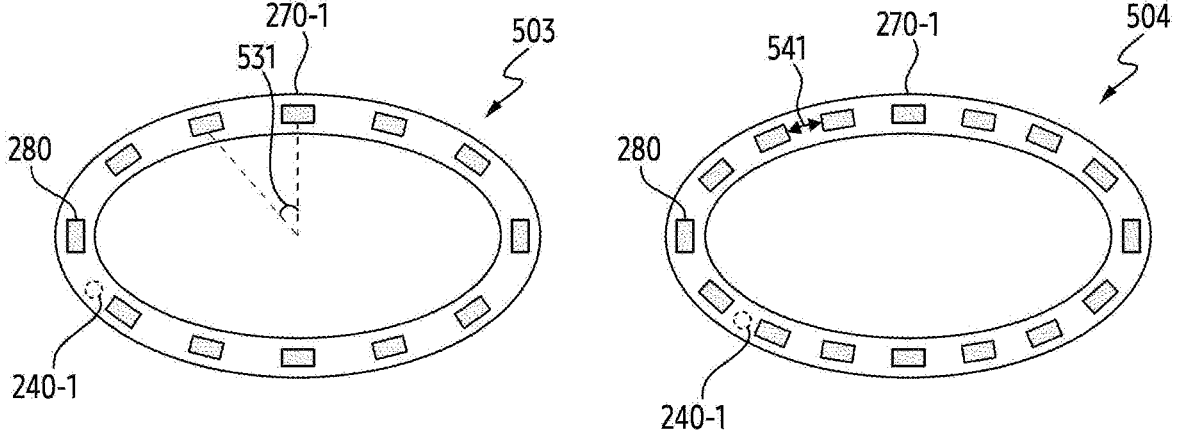
FIG. 5B illustrates a schematic example of a disposition structure of light sources of a wearable device, according to an embodiment of the disclosure.

FIG. 5B illustrates a schematic example of a disposition structure of light sources of a wearable device, according to an embodiment of the disclosure.

The description of FIG. 5B may refer to a component or structure of an electronic device 101 or a wearable device 200 described through FIGS. 1, 2A, 2B, 2C, 2D, 2E, 2F, 3A, and 3B.

Referring to FIG. 5B, a structure 270-1 for a left eye 265-1 is illustrated. The same structure as a circuit structure illustrated in FIG. 5B may also be applied to a structure 270-2 for a right eye 265-2, which is not illustrated. Herein, applying the same structure to the structure 270-2 may mean that the structure 270-2 and the structure 270-1 are mirror images with respect to each other. Applying the same structure to the structure 270-2 may mean that the structure 270-2 and the structure 270-1 are symmetrical to each other.

Referring to disposition structures 503 and 504 of FIG. 5B, the structure 270-1 for the left eye 265-1 may be oval-shaped. Referring to the disposition structures 503 and 504, light sources 280 may be equally arranged in the structure 270-1 for the left eye 265-1.

Referring to the disposition structure 503, the light sources 280 of the structure 270-1 for the left eye 265-1 may be arranged at an angle 531 equal to each other. Referring to the disposition structure 503, the light sources 280 of the structure 270-1 for the left eye 265-1 may not be arranged in a gap that is equal to each other. Among the light sources 280 of the structure 270-1, a separation distance between two neighboring light sources may not be equal. Herein, the angle 531 may be an angle formed by two neighboring light sources from a center point of the light sources 280 arranged in the structure 270-1.

Referring to the disposition structure 504, the light sources 280 of the structure 270-1 for the left eye 265-1 may be arranged in a gap 541 that is equal to each other. Referring to the disposition structure 504, the light sources 280 of the structure 270-1 for the left eye 265-1 may not be arranged at an angle equal to each other. An angle formed by two neighboring light sources from the center point of the light sources 280 of the structure 270-1 may not be equal. Herein, the gap 541 may be a distance between two neighboring light sources among the light sources 280 arranged in the structure 270-1.

Figure 5C:
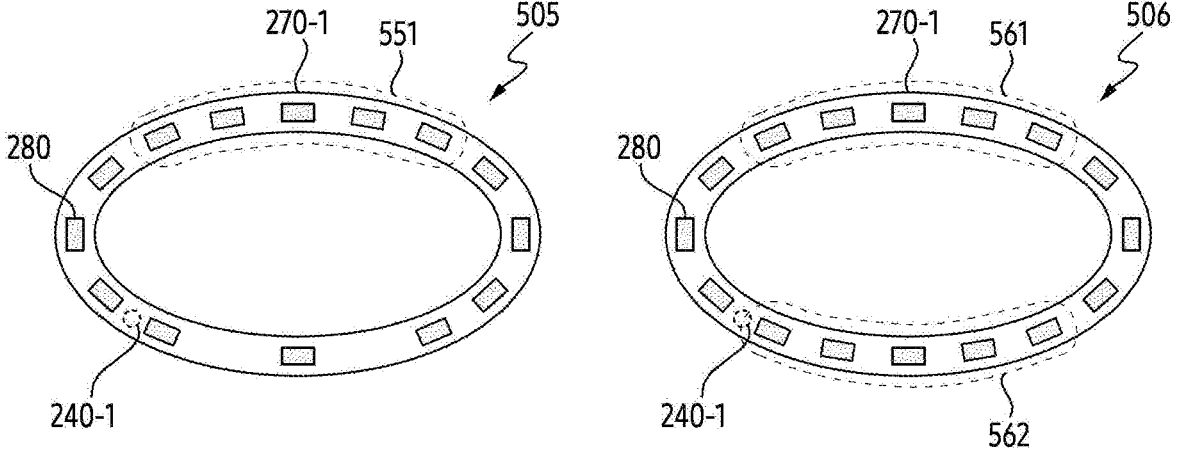
FIG. 5C illustrates a schematic example of a disposition structure of light sources of a wearable device, according to an embodiment of the disclosure.

FIG. 5C illustrates a schematic example of a disposition structure of light sources of a wearable device, according to an embodiment of the disclosure.

The description of FIG. 5C may refer to a component or structure of an electronic device 101 or a wearable device 200 described through FIGS. 1, 2A, 2B, 2C, 2D, 2E, 2F, 3A, and 3B.

Referring to FIG. 5C, a structure 270-1 for a left eye 265-1 is illustrated. The same structure as a circuit structure illustrated in FIG. 5C may also be applied to a structure 270-2 for a right eye 265-2, which is not illustrated. Herein, applying the same structure to the structure 270-2 may mean that the structure 270-2 and the structure 270-1 are mirror images with respect to each other. Applying the same structure to the structure 270-2 may mean that the structure 270-2 and the structure 270-1 are symmetrical to each other.

Referring to disposition structures 505 and 506 of FIG. 5C, the structure 270-1 for the left eye 265-1 may be oval-shaped. Referring to the disposition structures 505 and 506, light sources 280 may be arranged in the structure 270-1 for the left eye 265-1. Referring to the disposition structures 505 and 506, the light sources 280 may be arranged more concentrated in at least some areas of the left eye 265-1 than in other areas. Herein, the concentrated arrangement of the light sources 280 in some areas may mean that an angle formed by the light sources 280 arranged in some areas is narrower than an angle formed by the light sources 280 arranged in other areas. The concentrated arrangement of the light sources 280 in some areas may mean that a gap between the light sources 280 arranged in some areas is shorter than a gap between the light sources 280 arranged in other areas.

Referring to the disposition structure 505, the light sources 280 of the structure 270-1 for the left eye 265-1 may be concentratedly arranged in an area 551. For example, the area 551 may be located relatively above the structure 270-1. Herein, when a user wears the wearable device 200, the fact that the area 551 is located relatively above the structure 270-1 may mean that it is arranged in a direction of an upper eyelid based on the pupil of the left eye 265-1 of the user.

When the user wearing the wearable device 200 faces the front, the fact that the area 551 is located relatively above the structure 270-1 may mean that it is arranged in the direction of the upper eye based on the pupil of the left eye 265-1 of the user. However, it is not limited thereto. The area 551 may be located relatively lower, to the right, or to the left with respect to the structure 270-1. Herein, when the user wears the wearable device 200, the fact that the area 551 is located relatively lower with respect to the structure 270-1 may mean that it is arranged in a direction of a lower eyelid based on the pupil of the left eye 265-1 of the user. When the user wears the wearable device 200, the fact that the area 551 is located relatively to the right side with respect to the structure 270-1 may mean that it is arranged in a direction of the medial canthus based on the pupil of the left eye 265-1 of the user. When the user wears the wearable device 200, the fact that the area 551 is located relatively to the left side with respect to the structure 270-1 may mean that it is arranged in a direction of the lateral canthus based on the pupil of the left eye 265-1 of the user. A relatively left position with respect to the structure 270-2 may mean that it is arranged in the direction of the medial canthus based on the pupil of the right eye 265-2 of the user, when the user wears the wearable device 200. Located relatively to the right side with respect to the structure 270-2 may mean that it is arranged in the direction of the lateral canthus based on the pupil of the right eye 265-2 of the user, when the user wears the wearable device 200.

Referring to the disposition structure 506, the light sources 280 of the structure 270-1 for the left eye 265-1 may be concentratedly arranged in two or more areas 561 and 562. For example, the two or more areas 561 and 562 may be symmetrical with respect to the structure 270-1. Herein, the symmetry of the two or more areas 561 and 562 with respect to the structure 270-1 may mean that at least two areas among the two or more areas 561 and 562 are located opposite to each other based on a center point of the structure 270-1. However, it is not limited thereto. For example, the areas 561 and 562 may not be symmetrical with respect to the structure 270-1. For example, the area 561 may be located relatively above with respect to the center point of the structure 270-1, and the area 561 may be located relatively to the right with respect to the center point of the structure 270-1.

Figure 5D:
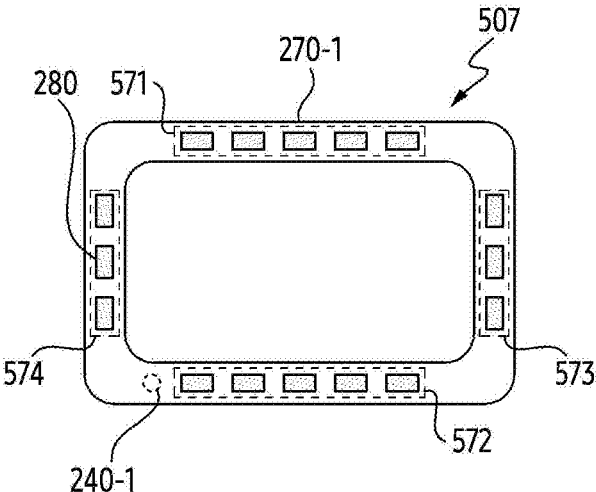
FIG. 5D illustrates a schematic example of a disposition structure of light sources of a wearable device, according to an embodiment of the disclosure.

FIG. 5D illustrates a schematic example of a disposition structure of light sources of a wearable device, according to an embodiment of the disclosure.

The description of FIG. 5D may refer to a component or structure of an electronic device 101 or a wearable device 200 described through FIGS. 1, 2A, 2B, 2C, 2D, 2E, 2F, 3A, and 3B.

Referring to FIG. 5D, a structure 270-1 for a left eye 265-1 is illustrated. The same structure as a circuit structure illustrated in FIG. 5D may also be applied to a structure 270-2 for a right eye 265-2, which is not illustrated. Herein, applying the same structure to the structure 270-2 may mean that the structure 270-2 and the structure 270-1 are mirror images with respect to each other. Applying the same structure to the structure 270-2 may mean that the structure 270-2 and the structure 270-1 are symmetrical to each other.

Referring to a disposition structure 507 of FIG. 5D, the structure 270-1 for the left eye 265-1 may be square. The disposition structure 507 may be exemplified by having a corner (or vertex) portion of the rectangular structure 270-1 in a round shape. However, it is not limited thereto.

Referring to the disposition structure 507, the light sources 280 of the structure 270-1 for the left eye 265-1 may be arranged in areas 571, 572, 573, and 574. For example, the area 571 may be located relatively above with respect to the structure 270-1. For example, the area 572 may be located relatively below with respect to the structure 270-1. For example, the area 573 may be located relatively to the right with respect to the structure 270-1. For example, the area 574 may be located relatively to the left with respect to the structure 270-1.

Different numbers of light sources 280 may be arranged in the areas 571, 572, 573, and 574. For example, the number of light sources 280 arranged in the areas 571 and 572 may be different from the number of light sources 280 arranged in the areas 573 and 574. However, it is not limited thereto. The number of light sources 280 arranged in the area 571 may be different from the number of light sources 280 arranged in the area 572. The number of light sources 280 arranged in the area 573 may be different from the number of light sources 280 arranged in the area 574.

Figure 6:
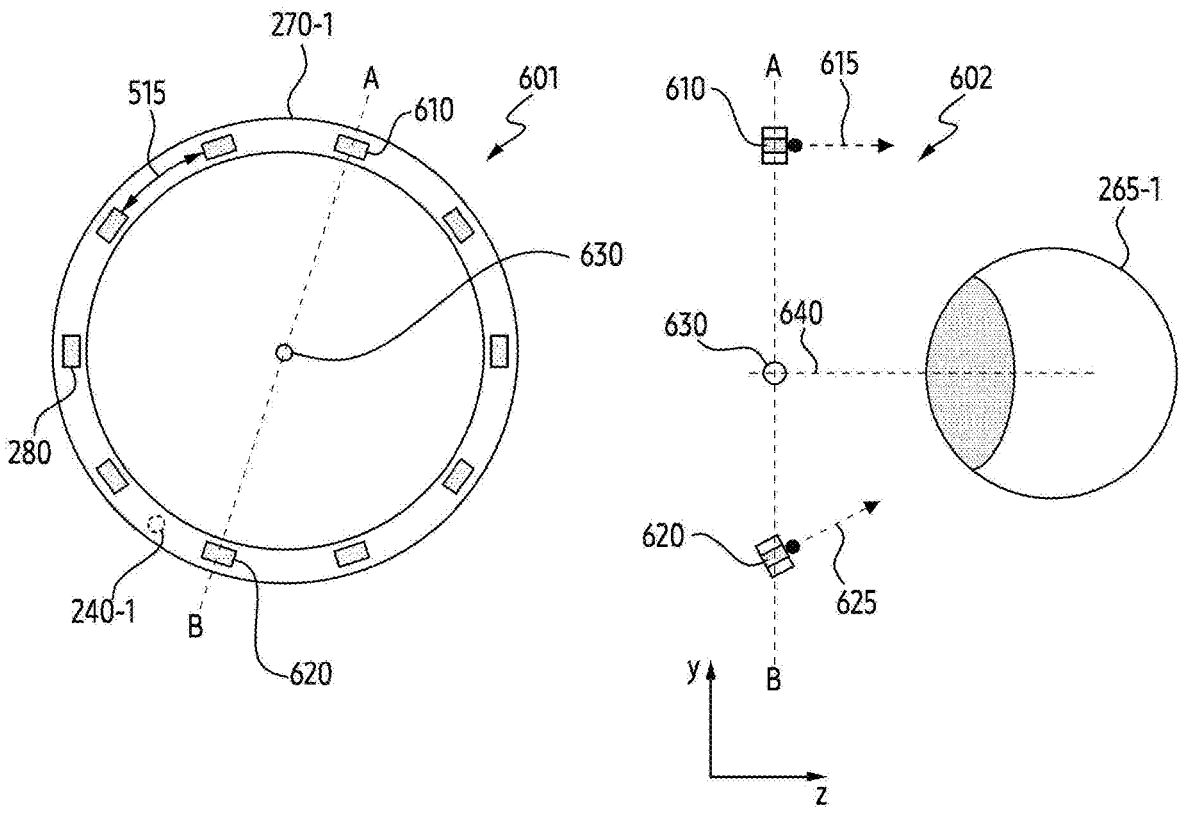
FIG. 6 illustrates a schematic example of an angle of light sources of a wearable device, according to an embodiment of the disclosure.

FIG. 6 illustrates a schematic example of an angle of light sources of a wearable device, according to an embodiment of the disclosure.

The description of FIG. 6 may refer to a component or structure of an electronic device 101 or a wearable device 200 described through FIGS. 1, 2A, 2B, 2C, 2D, 2E, 2F, 3A, and 3B.

Referring to FIG. 6, a structure 270-1 for a left eye 265-1 is illustrated. The same structure as a circuit structure illustrated in FIG. 6 may also be applied to a structure 270-2 for a right eye 265-2, which is not illustrated. Herein, applying the same structure to the structure 270-2 may mean that the structure 270-2 and the structure 270-1 are mirror images with respect to each other. Applying the same structure to the structure 270-2 may mean that the structure 270-2 and the structure 270-1 are symmetrical to each other.

A cutaway view 602 may illustrate a cross-section in which a disposition structure 601 is cut by a line including A-B.

Referring to disposition structure 601 of FIG. 6, the structure 270-1 for the left eye 265-1 may be circular. Referring to the disposition structure 601, light sources 280 may be evenly arranged in the structure 270-1 for the left eye 265-1. However, it is not limited thereto. The structure 270-1 may be polygonal, oval-shaped, or egg-shaped. At least a portion of the light sources 280 may be arranged unevenly in the structure 270-1.

A portion of the light sources 280 may be arranged to have a predetermined angle with respect to an axis 640 perpendicular to a surface perpendicular to an XY plane from a center point 630 of the structure 270-1. Herein, the angle that the light source has with respect to the axis 640 may mean an angle between an optical axis of the light source and the axis 640. For example, an angle between optical axes 615 and 625 of light sources 610 and 620 and the axis 640 may be an angle that the light sources 610 and 620 have with respect to the axis 640. Herein, the center point 630 may be a point where the pupil of the left eye 265-1 is positioned when a user wearing the wearable device 200 faces the front. However, it is not limited thereto.

For example, a portion of the light sources 280 may be arranged parallel to the axis 640. For example, a light source (e.g., the light source 610) positioned above among the light sources 280 may be arranged parallel to the axis 640. For example, the optical axis 615 of the light source 610 may be arranged parallel to the axis 640. However, it is not limited thereto.

For example, a portion of the light sources 280 may be arranged to form an acute angle with the axis 640. For example, the portion may be arranged such that an optical axis of a portion of the light sources 280 forms the acute angle with the axis 640. For example, a light source positioned below among the light sources 280 may be arranged to form the acute angle with the axis 640. For example, the light source 620 may be arranged to form the acute angle with the axis 640. For example, the optical axis 625 of the light source 620 may form the acute angle with the axis 640. For example, the light sources 620 may be arranged such that the optical axis 625 of the light source 620 forms an angle of 30 degrees with the axis 640. Herein, in case that the light source forms the acute angle with the axis 640, the optical axis of the light source may face the pupil of the left eye 265-1. However, it is not limited thereto.

Figure 7:
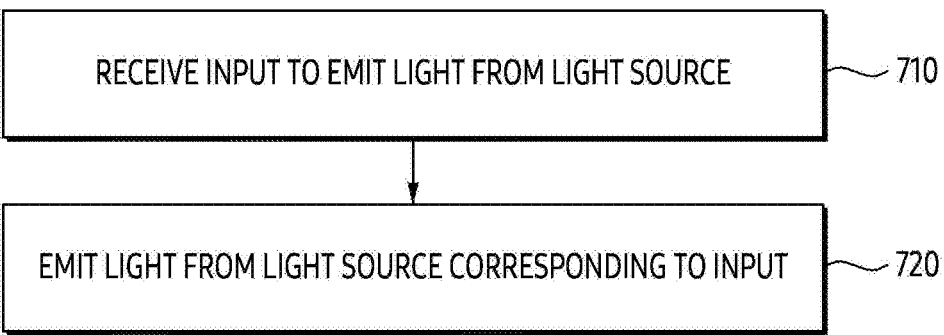
FIG. 7 is a flowchart of a method executed in a wearable device, according to an embodiment of the disclosure.

FIG. 7 is a flowchart of a method executed in a wearable device, according to an embodiment of the disclosure.

The description of FIG. 7 may refer to a component or structure of an electronic device 101 or a wearable device 200 described through FIGS. 1, 2A, 2B, 2C, 2D, 2E, 2F, 3A, and 3B.

Referring to FIG. 7, in operation 710, a processor 120 may receive an input for emitting a light source. Herein, the input for emitting the light source may include an input for eye tracking and/or an input for iris recognition.

The processor 120 may obtain the input for eye tracking. For example, the processor 120 may obtain an eye tracking request generated by a program 140 while the program 140 is being executed. For example, the processor 120 may obtain execution of the designated program 140 as the input for eye tracking. However, it is not limited thereto. For example, the processor 120 may obtain a user input requesting eye tracking. For example, the processor 120 may obtain the fact that a user wears the wearable device 200 as the input for eye tracking.

The processor 120 may obtain the input for iris recognition. For example, the processor 120 may obtain an iris recognition request generated by the program 140 while the program 140 is being executed. For example, the processor 120 may obtain a user authentication request from the program 140 as the iris recognition request. However, it is not limited thereto. For example, the processor 120 may obtain an input of the user requesting iris recognition.

In operation 720, the processor 120 may emit a light source corresponding to the input.

The processor 120 may control two or more light sources to emit light in response to the input for eye tracking. For example, in response to the input for eye tracking, the processor 120 may control two or more light sources to emit light through at least one channel (e.g., the channels 291-1 and 291-2) among a plurality of channels 291-1, 291-2, 291-3, and 291-4.

In response to the input for eye tracking, the processor 120 may control two or more light sources among light sources 281-1, 281-2, 281-3, 281-4, 281-5, 282-1, 282-2, 282-3, 282-4, and 282-5 corresponding to a left eye 265-1 to emit light. In response to the input for eye tracking, the processor 120 may control two or more light sources among light sources 283-1, 283-2, 283-3, 283-4, 283-5, 284-1, 284-2, 284-3, 284-4, and 284-5 corresponding to a right eye 265-2 to emit light.

The processor 120 may control at least one light source to emit light in response to the input for iris recognition. For example, in response to the input for iris recognition, the processor 120 may control at least one light source to emit light through at least one channel (e.g., the channel 291-1) among the plurality of channels 291-1, 291-2, 291-3, and 291-4 for the left eye 265-1. For example, the processor 120 may control at least one light source to emit light through at least one channel among a plurality of channels (not illustrated) for the right eye 265-2 in response to the input for iris recognition.

The processor 120 may select at least one light source among the light sources 280 in response to the input for iris recognition. For example, the processor 120 may select at least one light source based on user information. For example, the processor 120 may select at least one light source used during previous iris recognition of the user. Herein, the at least one light source used during the previous iris recognition of the user may be at least one light source used when iris recognition was successful. For example, when the user first attempts iris recognition, the processor 120 may select at least one predetermined light source. For example, the processor 120 may select at least one light source based on context information. For example, the processor 120 may select at least one light source designated by the program 140 that has requested iris recognition. The processor 120 may control the selected at least one light source to emit light.

In response to the input for iris recognition, the processor 120 may control at least one light source among the light sources 281-1, 281-2, 281-3, 281-4, 281-5, 282-1, 282-2, 282-3, 282-4, and 282-5 corresponding to the left eye 265-1 to emit light. In response to the input for iris recognition, the processor 120 may control at least one light source among the light sources 283-1, 283-2, 283-3, 283-4, 283-5, 284-1, 284-2, 284-3, 284-4, and 284-5 corresponding to the right eye 265-2 to emit light.

Figure 8:
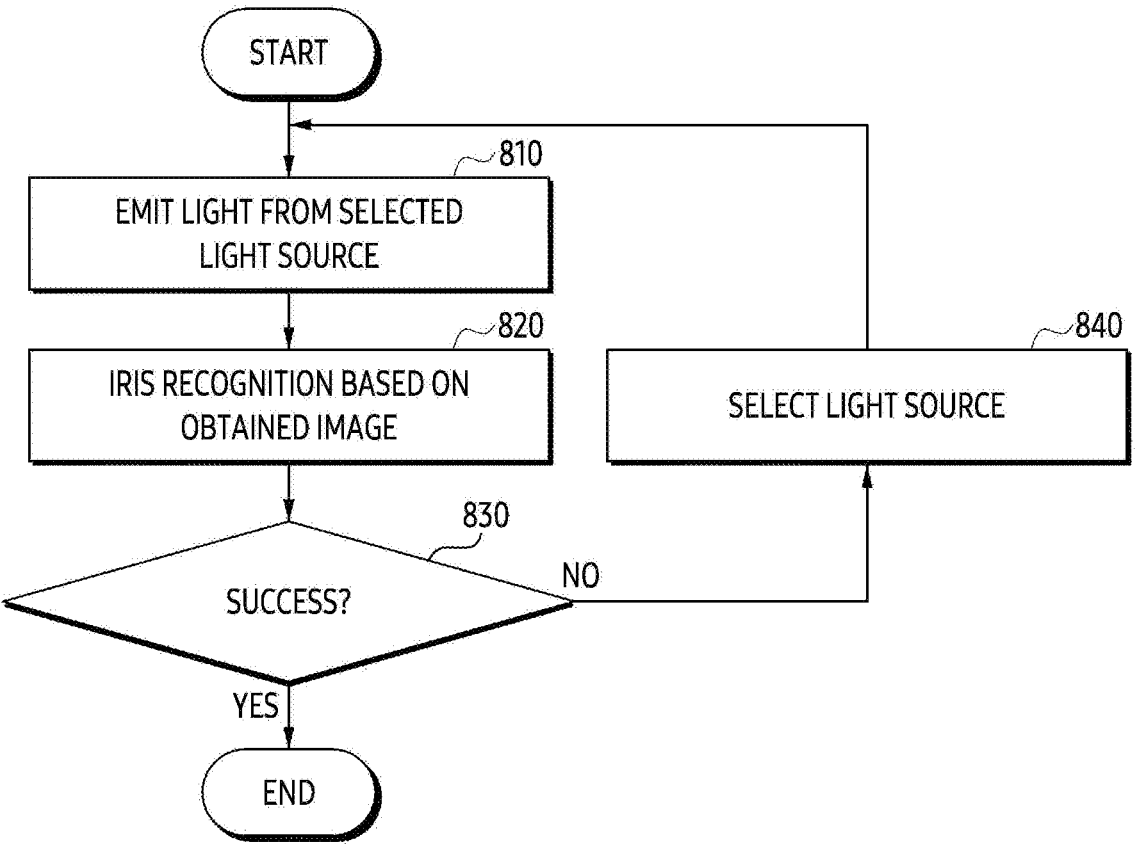
FIG. 8 is a flowchart of a method executed in a wearable device, according to an embodiment of the disclosure.

FIG. 8 is a flowchart of a method executed in a wearable device, according to an embodiment of the disclosure.

The description of FIG. 8 may refer to a component or structure of an electronic device 101 or a wearable device 200 described through FIGS. 1, 2A, 2B, 2C, 2D, 2E, 2F, 3A, and 3B. Operations of FIG. 8 may be included in operation 720 of FIG. 7.

Referring to FIG. 8, in operation 810, a processor 120 may emit light from a selected light source.

The processor 120 may control the selected light source to emit light. The processor 120 may control the selected light source to emit light in response to an input for eye tracking. The processor 120 may control the selected light source to emit light in response to the input for iris recognition.

The processor 120 may obtain an image for iris recognition through the camera 310 while the selected light source emits light. The processor 120 may obtain an image for iris recognition through the camera 310 while the selected light source emits light in response to the input for iris recognition. The processor 120 may obtain an image for iris recognition and eye tracking through the camera 310 while the selected light source emits light in response to the input for iris recognition during eye tracking. The processor 120 may obtain an image for eye tracking through the camera 310 while the selected light source emits light. The processor 120 may obtain an image for eye tracking through the camera 310 while the selected light source emits light in response to the input for eye tracking.

In operation 820, the processor 120 may recognize the iris based on the obtained image. The processor 120 may identify a position of the iris of each of both eyes 265-1 and 265-2 of a user based on the image for eye tracking. The processor 120 may perform iris recognition based on the image for iris recognition. The processor 120 may perform iris recognition and/or eye tracking based on the image obtained through the camera 310 in response to the input for iris recognition and/or the input for eye tracking. The processor 120 may perform iris recognition and eye tracking based on the image obtained in response to the input for eye tracking. The processor 120 may perform iris recognition based on the image obtained in response to the input for iris recognition. According to an embodiment, the processor 120 may identify the position of the iris of each of both eyes 265-1 and 265-2 of the user based on the image for eye tracking, and perform eye tracking based on the identified position of the iris.

In operation 830, the processor 120 may determine whether iris recognition is successful.

The processor 120 may determine whether iris recognition based on the image for iris recognition was successful in response to the input for iris recognition. The processor 120 may determine whether iris recognition based on the image for eye tracking was successful in response to the input for eye tracking. The processor 120 may determine whether iris recognition based on the image for eye tracking was successful in response to the input for iris recognition during eye tracking. The processor 120 may determine whether eye tracking based on the image for eye tracking was successful in response to the input for eye tracking. The processor 120 may determine whether gaze of the user based on the image for eye tracking has been identified in response to the input for eye tracking.

In operation 830, in case that iris recognition based on the image for iris recognition is successful, the processor 120 may terminate the operation of FIG. 8. In operation 830, in case that iris recognition based on the image for iris recognition fails, the processor 120 may perform operation 840.

In operation 830, in case that iris recognition based on the image for eye tracking is successful, the processor 120 may terminate the operation of FIG. 8. In operation 830, in case that iris recognition based on the image for eye tracking fails, the processor 120 may perform operation 840.

In operation 830, in case that iris recognition and eye tracking based on the image for eye tracking are successful, the processor 120 may terminate the operation of FIG. 8. In operation 830, in case that at least one of iris recognition or eye tracking based on the image for eye tracking fails, the processor 120 may perform operation 840.

In operation 830, in case that iris recognition is successful, the processor 120 may return to a previous state. For example, in case that iris recognition in response to the input for iris recognition is successful, the processor 120 may return to the previous state. Herein, the previous state may be a state before obtaining the input for iris recognition. For example, in the previous state, in case that eye tracking was being performed before the input for iris recognition, the processor 120 may perform eye tracking again in case that iris recognition is successful.

In operation 840, the processor 120 may select a light source. The processor 120 may select a light source that is at least partially different from the light source selected for a previous operation. The processor 120 may select a light source that is at least partially different from the light source selected for previous operations 810 and 820.

The processor 120 may select a light source different from the light source selected for previous iris recognition. The processor 120 may select a light source different from the light source selected for the previous eye tracking. Herein, the other light source may be selected based on user information. For example, the other light source may be the light source used when the previous operation was successful. For example, the other light source may be a light source designated by a program 140. However, it is not limited thereto. The other light source may include a previously selected light source. When performing operation 810 after operation 840, the processor 120 may change at least one of intensity of the selected light source, light emission time, or frequency of emission light. For example, in case that the other light source includes the previously selected light source, the processor 120 may change at least one of the intensity of the selected light source, the light emission time, or the frequency of the emission light, when performing operation 810 after operation 840.

Figure 9:
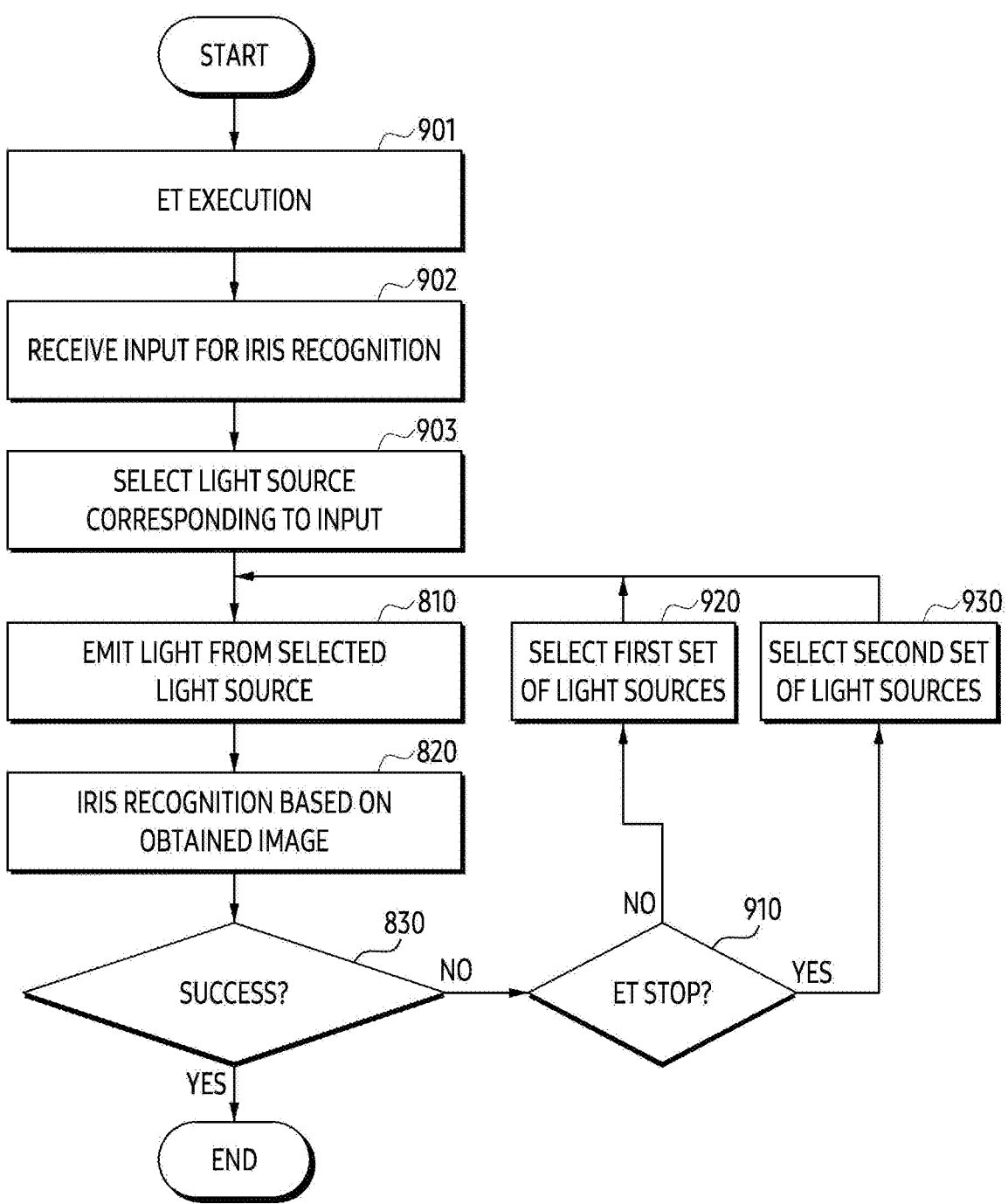
FIG. 9 is a flowchart of a method executed in a wearable device, according to an embodiment of the disclosure.

FIG. 9 is a flowchart of a method executed in a wearable device, according to an embodiment of the disclosure.

The description of FIG. 9 may refer to a component or structure of an electronic device 101 or a wearable device 200 described through FIGS. 1, 2A, 2B, 2C, 2D, 2E, 2F, 3A, and 3B.

Operations 810, 820, and 830 included in the flowchart of FIG. 9 may be the same as operations 810, 820, and 830 described with reference to FIG. 8.

Referring to FIG. 9, in operation 901, a processor 120 may execute eye tracking. The processor 120 may control a light source for eye tracking to emit light in response to an input for eye tracking. The processor 120 may obtain an image for eye tracking based on a first camera for eye tracking among a plurality of cameras. The processor 120 may obtain the image for eye tracking based on the first camera for eye tracking among the plurality of cameras based on the input for eye tracking. The processor 120 may identify gaze of a user. The processor 120 may track the gaze of the user. For example, the processor 120 may identify a position of the iris of each of both eyes of the user based on the image for eye tracking. For example, the processor 120 may track the gaze of the user based on the position of the iris. However, it is not limited thereto. For example, the processor 120 may track the gaze of the user based on the position of the iris identified based on an image corresponding to one eye among both eyes of the user.

In operation 902, the processor 120 may receive an input for iris recognition. For example, the processor 120 may obtain an iris recognition request generated by a program 140 while the program 140 is being executed. For example, the processor 120 may obtain a user authentication request from the program 140 as the iris recognition request. However, it is not limited thereto. For example, the processor 120 may obtain an input of the user requesting iris recognition.

In operation 903, the processor 120 may select a light source corresponding to the input. The processor 120 may select at least one light source among light sources in response to the input for iris recognition. For example, the processor 120 may select at least one light source based on user information. For example, the processor 120 may select at least one light source used during previous iris recognition of the user. Herein, the at least one light source used during the previous iris recognition of the user may be at least one light source used when iris recognition was successful. For example, when the user first attempts iris recognition, the processor 120 may select at least one predetermined light source. For example, the processor 120 may select at least one light source based on context information. For example, the processor 120 may select at least one light source designated by the program 140 that has requested iris recognition. The processor 120 may control the selected at least one light source to emit light.

In operation 810, the processor 120 may emit the selected light source.

In operation 820, the processor 120 may recognize the iris based on the obtained image.

In operation 830, the processor 120 may determine whether iris recognition is successful.

In operation 830, in case that iris recognition based on the image for iris recognition is successful, the processor 120 may terminate the operation of FIG. 8. In operation 830, in case that iris recognition based on the image for iris recognition fails, the processor 120 may perform operation 910.

In operation 830, in case that iris recognition is successful, the processor 120 may return to a previous state. For example, in case that iris recognition in response to the input for iris recognition is successful, the processor 120 may return to the previous state. Herein, the previous state may be a state before obtaining the input for iris recognition. For example, in the previous state, in case that eye tracking was being performed before the input for iris recognition, the processor 120 may perform eye tracking again in case that iris recognition is successful.

In operation 910, the processor 120 may determine whether to stop eye tracking. The processor 120 may determine whether to re-obtain the image for the iris recognition during the eye tracking.

For example, in case that it is identified that simultaneous execution of eye tracking and iris recognition is possible, the processor 120 may determine not to stop eye tracking. For example, in case that it is identified that simultaneous execution of eye tracking and iris recognition is difficult, the processor 120 may determine to stop eye tracking. Herein, simultaneous execution of eye tracking and iris recognition may mean performing iris recognition on the image for eye tracking. Simultaneous execution of eye tracking and iris recognition may mean performing eye tracking and iris recognition on the image for eye tracking. Simultaneous execution of eye tracking and iris recognition may mean that the image for eye tracking is obtained with a smaller number of light sources than the number of used light sources in a case of executing only eye tracking. Simultaneous execution of eye tracking and iris recognition may mean that at least one combination of light sources for eye tracking and iris recognition exists among a plurality of combinations of light sources.

In operation 910, in response to determining to continue the eye tracking, the processor 120 may perform operation 920. In operation 910, in response to determining to stop the eye tracking, the processor 120 may perform operation 930.

In operation 920, the processor 120 may select a first set of light sources. In response to determining not to stop the eye tracking, the processor 120 may perform iris recognition by using the first set of light sources different from previously selected light sources. Herein, the first set of light sources may not be included in the previously selected light sources. However, it is not limited thereto. For example, the first set of light sources may be a portion of the previously selected light sources. Herein, the first set may include at least one combination of light sources for eye tracking and iris recognition.

In operation 930, the processor 120 may select a second set of light sources. In response to determining to stop the eye tracking, the processor 120 may perform iris recognition by using the second set of light sources different from the previously selected light sources. Herein, the second set of light sources may be the light sources used when previous iris recognition was successful. However, it is not limited thereto. Herein, the second set may include at least one combination of light sources for iris recognition.

Figure 10A:
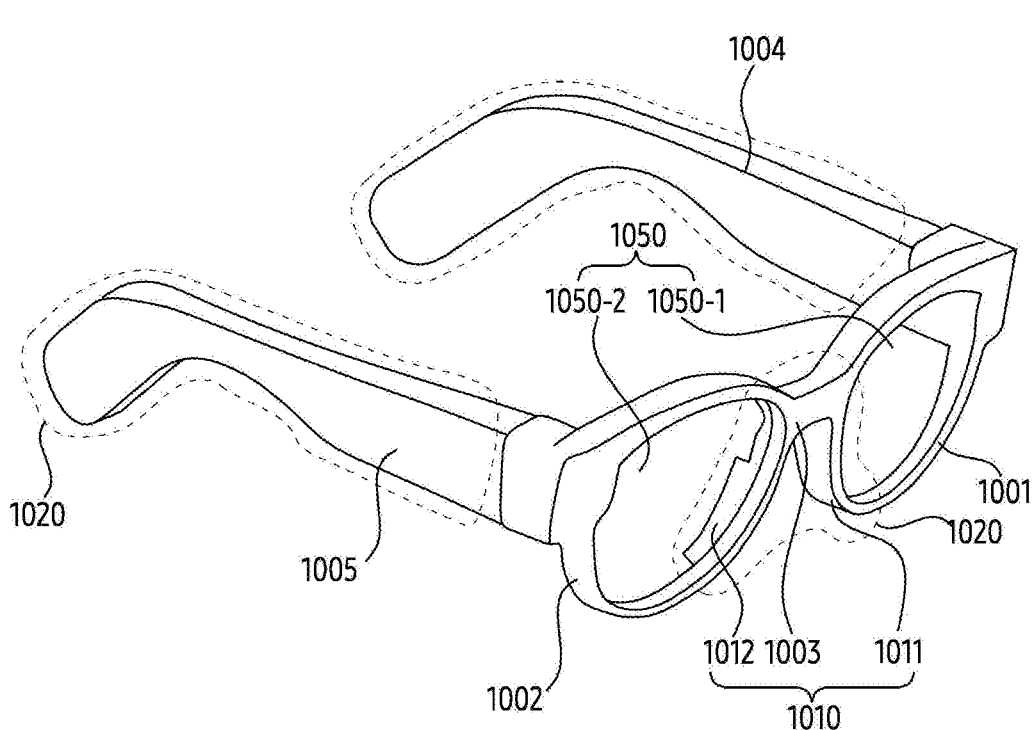
FIG. 10A illustrates an example of an exterior of a first surface of a wearable device, according to an embodiment of the disclosure.
Figure 10B:
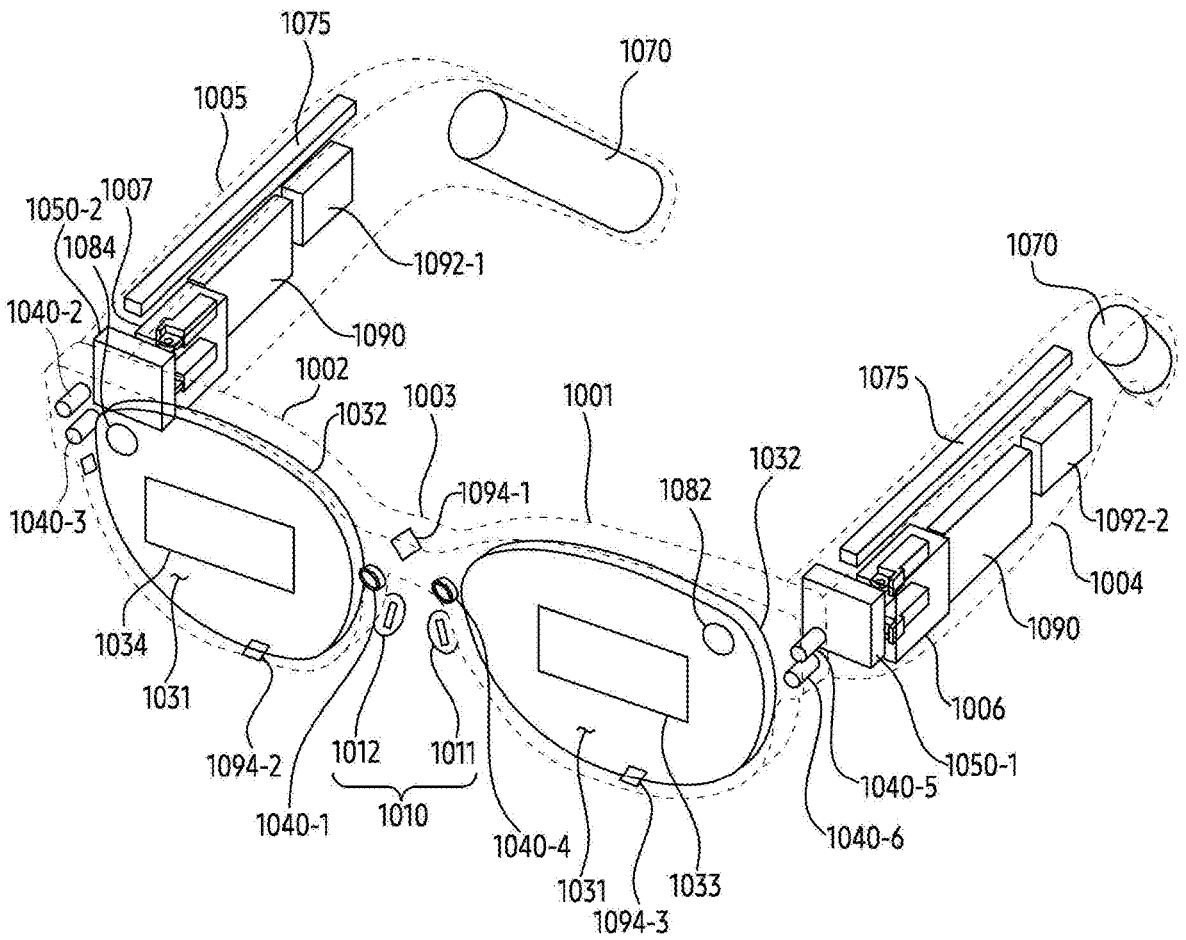
FIG. 10B illustrates an example of an exterior of a second surface of a wearable device, according to an embodiment of the disclosure.

FIG. 10A illustrates an example of an exterior of a first surface of a wearable device, according to an embodiment of the disclosure. FIG. 10B illustrates an example of an exterior of a second surface of a wearable device, according to an embodiment of the disclosure.

Referring to FIGS. 10A and 10B, a wearable device 1000 may be included in an electronic device 101 of FIG. 1.

FIG. 10A illustrates an example of a perspective view of a wearable device according to an embodiment. FIG. 10B illustrates an example of one or more hardware disposed in a wearable device according to an embodiment.

Referring to FIGS. 10A and 10B, a wearable device 1000 may include a first terminal 120-1 of FIGS. 1 and 2A to 2F. As shown in FIG. 10A, according to an embodiment, the wearable device 1000 may include at least one display 1050, and a frame supporting the at least one display 1050.

According to an embodiment, the wearable device 1000 may be wearable on a portion of the user's body. The wearable device 1000 may provide augmented reality (AR), virtual reality (VR), or mixed reality (MR) combining the augmented reality and the virtual reality to a user wearing the wearable device 1000. For example, the wearable device 1000 may output a virtual reality image to a user through the at least one display 1050 in response to a user's preset gesture obtained through a motion recognition camera 1040-2 and 1040-5 of FIG. 10B.

According to an embodiment, the at least one display 1050 in the wearable device 1000 may provide visual information to a user. For example, the at least one display 1050 may include a transparent or translucent lens. The at least one display 1050 may include a first display 1050-1 and/or a second display 1050-2 spaced apart from the first display 1050-1. For example, the first display 1050-1 and the second display 1050-2 may be disposed at positions corresponding to the user's left and right eyes, respectively.

Referring to FIG. 10B, the at least one display 1050 may provide another visual information, which is distinct from the visual information, together with the visual information included in the ambient light passing through the lens, a user wearing the wearable device 1000, by forming a displaying area on the lens. The lens may be formed based on at least one of a fresnel lens, a pancake lens, or a multi-channel lens. For example, the displaying area formed by the at least one display 1050 may be formed on a second surface 1032 among a first surface 1031 and the second surface 1032 of the lens. When the user wears the wearable device 1000, the ambient light may be transmitted to the user by being incident on the first surface 1031 and being penetrated through the second surface 1032. For another example, the at least one display 1050 may display the virtual reality image to be combined with a real screen transmitted through the ambient light. The virtual reality image outputted from the at least one display 1050 may be transmitted to the user's eyes through the one or more hardware (e.g., optical devices 1082 and 1084, and/or at least one of waveguides 1033 and 1034)) included in the wearable device 1000.

According to an embodiment, the wearable device 1000 may include the waveguides 1033 and 1034 that diffracts light transmitted from the at least one display 1050 and relayed by the optical devices 1082 and 1084 and transmits it to the user. The waveguides 1033 and 1034 may be formed based on at least one of glass, plastic, or polymer. A nano pattern may be formed on at least a portion of the outside or inside of the waveguides 1033 and 1034. The nano pattern may be formed based on a grating structure having a polygonal or curved shape. Light incident to one end of the waveguides 1033 and 1034 may be propagated to the other end of the waveguides 1033 and 1034 by the nano pattern. The waveguides 1033 and 1034 may include at least one of at least one diffraction element (e.g., a diffractive optical element (DOE), a holographic optical element (HOE)), and a reflection element (e.g., a reflection mirror). For example, the waveguides 1033 and 1034 may be disposed in the wearable device 1000 to guide a screen displayed by the at least one display 1050 to the user's eyes. For example, the screen may be transmitted to the user's eyes based on total internal reflection (TIR) generated in the waveguides 1033 and 1034.

According to an embodiment, the wearable device 1000 may analyze an object included in a real image collected through a photographing camera 1040-3, combine virtual object corresponding to an object that become a subject of augmented reality provision among the analyzed object, and display them on the at least one display 1050. The virtual object may include at least one of text and images for various information associated with the object included in the real image. The wearable device 1000 may analyze the object based on a multi-camera such as a stereo camera. For the object analysis, the wearable device 1000 may execute time-of-flight (ToF) and/or simultaneous localization and mapping (SLAM) supported by the multi-camera. The user wearing the wearable device 1000 may watch an image displayed on the at least one display 1050.

According to an embodiment, the frame may be configured with a physical structure in which the wearable device 1000 may be worn on the user's body. According to an embodiment, the frame may be configured so that when the user wears the wearable device 1000, the first display 1050-1 and the second display 1050-2 may be positioned corresponding to the user's left and right eyes. The frame may support the at least one display 1050. For example, the frame may support the first display 1050-1 and the second display 1050-2 to be positioned at positions corresponding to the user's left and right eyes.

Referring to FIG. 10A, according to an embodiment, the frame may include an area 1020 at least partially in contact with the portion of the user's body in case that the user wears the wearable device 1000. For example, the area 1020 of the frame in contact with the portion of the user's body may include an area in contact with a portion of the user's nose, a portion of the user's ear, and a portion of the side of the user's face that the wearable device 1000 contacts. According to an embodiment, the frame may include a nose pad 1010 that is contacted on the portion of the user's body. When the wearable device 1000 is worn by the user, the nose pad 1010 may be contacted on the portion of the user's nose. The frame may include a first temple 1004 and a second temple 1005 that is contacted on another portion of the user's body that is distinct from the portion of the user's body.

For example, the frame may include a first rim 1001 surrounding at least a portion of the first display 1050-1, a second rim 1002 surrounding at least a portion of the second display 1050-2, a bridge 1003 disposed between the first rim 1001 and the second rim 1002, a first pad 1011 disposed along a portion of the edge of the first rim 1001 from one end of the bridge 1003, a second pad 1012 disposed along a portion of the edge of the second rim 1002 from the other end of the bridge 1003, the first temple 1004 extending from the first rim 1001 and fixed to a portion of the wearer's ear, and the second temple 1005 extending from the second rim 1002 and fixed to a portion of the ear opposite to the ear. The first pad 1011 and the second pad 1012 may be in contact with the portion of the user's nose, and the first temple 1004 and the second temple 1005 may be in contact with a portion of the user's face and the portion of the user's ear. The temples 1004 and 1005 may be rotatably connected to the rim through hinge units 1006 and 1007 of FIG. 10B. The first temple 1004 may be rotatably connected with respect to the first rim 1001 through the first hinge unit 1006 disposed between the first rim 1001 and the first temple 1004. The second temple 1005 may be rotatably connected with respect to the second rim 1002 through the second hinge unit 1007 disposed between the second rim 1002 and the second temple 1005. According to an embodiment, the wearable device 1000 may identify an external object (e.g., a user's fingertip) touching the frame and/or a gesture performed by the external object by using a touch sensor, a grip sensor, and/or a proximity sensor formed on at least a portion of the surface of the frame.

According to an embodiment, the wearable device 1000 may include hardware that performs various functions. For example, the hardware may include at least one display 1050, one or more cameras 1040-1, 1040-2, 1040-3, 1040-4, 1040-5, and 1040-6, a battery module 1070, an antenna module 1075, optical devices 1082 and 1084, speakers 1092-1, 1092-2, microphones 1094-2, 1094-3, a light emitting module (not shown), and/or a printed circuit board 1090. Various hardware may be disposed in the frame. The at least one display 1050 of FIG. 10B may correspond to the display module 160 of FIG. 1. The at least one display 1050 of FIG. 10B may correspond to the displays 250-1 and 250-2 of FIG. 2A. The one or more cameras 1040-1, 1040-2, 1040-3, 1040-4, 1040-5, and 1040-6 of FIG. 10B may correspond to the camera module 180 of FIG. 1. The one or more cameras 1040-1, 1040-2, 1040-3, 1040-4, 1040-5, and 1040-6 of FIG. 10B may correspond to cameras 240-1, 240-2, 240-3, 240-4, 240-5, 240-6, 240-7, 240-8, 240-9, 240-10, and 240-11 of FIG. 2A or 2B. The battery module 1070 of FIG. 10B may correspond to the battery 189 of FIG. 1. The antenna module 1075 of FIG. 10B may correspond to the antenna module 197 of FIG. 1. The speakers 1092-1 and 1092-2 of FIG. 10B may correspond to the sound output module 155 of FIG. 1. Microphones 1094-1, 1094-2, and 1094-3 of FIG. 10B may correspond to the input module 150 of FIG. 1. The light emitting module (not shown) of FIG. 10B may correspond to one or more light sources 280 of FIG. 2D. The printed circuit board 1090 of FIG. 10B may correspond to structures 270-1, 270-2, 270-3, and 270-4 of FIG. 2D.

According to an embodiment, the microphones 1094-1, 1094-2, and 1094-3 of the wearable device 1000 may obtain a sound signal, by being disposed on at least a portion of the frame. The first microphone 1094-1 disposed on the nose pad 1010, the second microphone 1094-2 disposed on the second rim 1002, and the third microphone 1094-3 disposed on the first rim 1001 are illustrated in FIG. 10B, but the number and disposition of the microphone 1094 are not limited to an embodiment of FIG. 10B. In case that the number of the microphone 1094 included in the wearable device 1000 is two or more, the wearable device 1000 may identify the direction of the sound signal by using a plurality of microphones disposed on different portions of the frame.

According to an embodiment, the optical devices 1082 and 1084 may transmit the virtual object transmitted from the at least one display 1050 to the waveguides 1033 and 1034. For example, the optical devices 1082 and 1084 may be a projector. The optical devices 1082 and 1084 may be disposed adjacent to the at least one display 1050 or may be included in the at least one display 1050 as portion of the at least one display 1050. The first optical device 1082 may correspond to the first display 1050-1, and the second optical device 1084 may correspond to the second display 1050-2. The first optical device 1082 may transmit the light outputted from the first display 1050-1 to the first waveguide 1033, and the second optical device 1084 may transmit light outputted from the second display 1050-2 to the second waveguide 1034.

In an embodiment, a camera may include an eye tracking camera (ET CAM) 1040-1 and 1040-4, the motion recognition camera 1040-2 and 1040-5, and/or the photographing camera 1040-3 and 1040-6. The photographing camera, the eye tracking camera 1040-1 and 1040-4, and the motion recognition camera 1040-2 and 1040-5 may be disposed at different positions on the frame and may perform different functions. The eye tracking camera 1040-1 may output data indicating the gaze of the user wearing the wearable device 1000. For example, the wearable device 1000 may detect the gaze from an image including the user's pupil obtained through the eye tracking camera 1040-1 and 1040-4. An example in which the eye tracking camera 1040-1 is disposed toward the user's right eye is illustrated in FIG. 10B, but the embodiment is not limited thereto, and the eye tracking camera 1040-1 and 1040-4 may be disposed alone toward the user's left eye or may be disposed toward two eyes.

In an embodiment, the photographing camera 1040-3 and 1040-6 may photograph a real image or background to be matched with a virtual image in order to implement the augmented reality or mixed reality content. The photographing camera may photograph an image of a specific object existing at a position viewed by the user and may provide the image to the at least one display 1050. The at least one display 1050 may display one image in which a virtual image provided through the optical devices 1082 and 1084 is overlapped with information on the real image or background including an image of the specific object obtained by using the photographing camera. In an embodiment, the photographing camera may be disposed on the bridge 1003 disposed between the first rim 1001 and the second rim 1002.

In an embodiment, the eye tracking camera 1040-1 and 1040-4 may implement a more realistic augmented reality by matching the user's gaze with the visual information provided on the at least one display 1050 by tracking the gaze of the user wearing the wearable device 1000. For example, when the user looks at the front, the wearable device 1000 may naturally display environment information associated with the user's front on the at least one display 1050 at the position where the user is positioned. The eye tracking camera 1040-1 and 1040-4 may be configured to capture an image of the user's pupil in order to determine the user's gaze. For example, the eye tracking camera 1040-1 and 1040-4 may receive gaze detection light reflected from the user's pupil and may track the user's gaze based on the position and movement of the received gaze detection light. In an embodiment, the eye tracking camera 1040-1 and 1040-4 may be disposed at a position corresponding to the user's left and right eyes. For example, the eye tracking camera 1040-1 and 1040-4 may be disposed in the first rim 1001 and/or the second rim 1002 to face the direction in which the user wearing the wearable device 1000 is positioned.

In an embodiment, the motion recognition camera 1040-2 and 1040-5 may provide a specific event to the screen provided on the at least one display 1050 by recognizing the movement of the whole or portion of the user's body, such as the user's torso, hand, or face. The motion recognition camera 1040-2 and 1040-5 may obtain a signal corresponding to the gesture by recognizing the user's gesture, and may provide a display corresponding to the signal to the at least one display 1050. The processor may identify a signal corresponding to the operation and may perform a preset function based on the identification. In an embodiment, the motion recognition camera 1040-2 and 1040-5 may be disposed on the first rim 1001 and/or the second rim 1002.

In an embodiment, the camera 1040 included in the wearable device 1000 is not limited to the above-described eye tracking camera 1040-1 and 1040-4 and the motion recognition camera 1040-2 and 1040-5. For example, the wearable device 1000 may identify an external object included in the FoV by using the photographing camera 1040-3 and 1040-6 disposed toward the user's FoV. That the wearable device 1000 identifies the external object may be performed based on a sensor for identifying a distance between the wearable device 1000 and the external object, such as a depth sensor and/or a time of flight (ToF) sensor. The camera disposed toward the FoV may support an autofocus function and/or an optical image stabilization (OIS) function. For example, the wearable device 1000 may include the camera 1040 (e.g., a face tracking (FT) camera) disposed toward the face in order to obtain an image including the face of the user wearing the wearable device 1000.

Although not illustrated, the wearable device 1000 according to an embodiment may further include a light source (e.g., LED) that emits light toward a subject (e.g., user's eyes, face, and/or an external object in the FoV) photographed by using the camera. The light source may include an LED having an infrared wavelength. The light source may be disposed on at least one of the frame, and the hinge units 1006 and 1007.

According to an embodiment, the battery module 1070 may supply power to electronic components of the wearable device 1000. In an embodiment, the battery module 1070 may be disposed in the first temple 1004 and/or the second temple 1005. For example, the battery module 1070 may be a plurality of battery modules 1070. The plurality of battery modules 1070, respectively, may be disposed on each of the first temple 1004 and the second temple 1005. In an embodiment, the battery module 1070 may be disposed at an end of the first temple 1004 and/or the second temple 1005.

In an embodiment, the antenna module 1075 may transmit the signal or power to the outside of the wearable device 1000 or may receive the signal or power from the outside. The antenna module 1075 may be electronically and/or operably connected to a communication circuit of the wearable device 1000. In an embodiment, the antenna module 1075 may be disposed in the first temple 1004 and/or the second temple 1005. For example, the antenna module 1075 may be disposed close to one surface of the first temple 1004 and/or the second temple 1005.

In an embodiment, the speakers 1092-1 and 1092-2 may output a sound signal to the outside of the wearable device 1000. A sound output module may be referred to as a speaker. In an embodiment, the speakers 1092-1 and 1092-2 may be disposed in the first temple 1004 and/or the second temple 1005 in order to be disposed adjacent to the ear of the user wearing the wearable device 1000. For example, the wearable device 1000 may include the second speaker 1092-2 disposed adjacent to the user's left ear by being disposed in the first temple 1004, and the first speaker 1092-1 disposed adjacent to the user's right ear by being disposed in the second temple 1005.

In an embodiment, the light emitting module (not illustrated) may include at least one light emitting element. The light emitting module may emit light of a color corresponding to a specific state or may emit light through an operation corresponding to the specific state in order to visually provide information on a specific state of the wearable device 1000 to the user. For example, in case that the wearable device 1000 needs charging, it may repeatedly emit red light at a preset timing. In an embodiment, the light emitting module may be disposed on the first rim 1001 and/or the second rim 1002.

Referring to FIG. 10B, according to an embodiment, the wearable device 1000 may include the printed circuit board (PCB) 1090. The PCB 1090 may be included in at least one of the first temple 1004 or the second temple 1005. The PCB 1090 may include an interposer disposed between at least two sub PCBs. On the PCB 1090, one or more hardware included in the wearable device 1000 may be disposed. The wearable device 1000 may include a flexible PCB (FPCB) for interconnecting the hardware.

According to an embodiment, the wearable device 1000 may include at least one of a gyro sensor, a gravity sensor, and/or an acceleration sensor for detecting the posture of the wearable device 1000 and/or the posture of a body part (e.g., a head) of the user wearing the wearable device 1000. Each of the gravity sensor and the acceleration sensor may measure gravity acceleration, and/or acceleration based on preset 3-dimensional axes (e.g., x-axis, y-axis, and z-axis) perpendicular to each other. The gyro sensor may measure angular velocity of each of preset 3-dimensional axes (e.g., x-axis, y-axis, and z-axis). At least one of the gravity sensor, the acceleration sensor, and the gyro sensor may be referred to as an inertial measurement unit (IMU). According to an embodiment, the wearable device 1000 may identify the user's motion and/or gesture performed to execute or stop a specific function of the wearable device 1000 based on the IMU.

The wearable device 1000 may perform eye tracking and/or iris recognition by using the eye tracking camera 1040-1 and a light source (e.g., LED) that emits light toward the user's eyes. A method of performing eye tracking and/or iris recognition by the wearable device 1000 may be the same as a method of performing eye tracking and/or iris recognition by the wearable device 200.

A wearable device 200 and 1000 as described above may comprise a plurality of light sources 280 configured to emit light toward an eye of a user wearing the wearable device 200 and 1000. According to an embodiment, the wearable device 200 and 1000 may comprise a camera 310 configured to capture images of at least a part of the eye of the user wearing the wearable device 200 and 1000. According to an embodiment, the wearable device 200 and 1000 may comprise at least one processor (e.g., processor 120) comprising processing circuitry. According to an embodiment, the wearable device 200 and 1000 may comprise memory 130, comprising one or more storage mediums, storing instructions. According to an embodiment, the instructions that, when executed by the at least one processor 120 individually or collectively, may cause the wearable device 200 and 1000 to perform eye tracking based on the images captured by the camera 310 while the plurality of the light sources 280 are controlled to emit light toward the eye of the user. According to an embodiment, the instructions that, when executed by the at least one processor 120 individually or collectively, may cause the wearable device 200 and 1000 to perform iris recognition based on at least one image captured by the camera 310 while a portion of the plurality of the light sources 280 is controlled to emit light toward the eye of the user and a remaining portion of the plurality of the light sources 280 is deactivated.

In an embodiment, the portion of the plurality of the light sources 280 used for performing the iris recognition may correspond to a sub-set of the same light sources used for performing the eye tracking.

In an embodiment, the number of lights sources used for performing the iris recognition may be less than the number of light sources used for performing the eye tracking.

In an embodiment, among the plurality of the light sources used for the performing eye tracking, two light sources may be selected for performing the iris recognition.

In an embodiment, among the plurality of the light sources used for the performing eye tracking, only one thereof may be selected for performing the iris recognition.

In an embodiment, the instructions that, when executed by the at least one processor 120 individually or collectively, may cause the wearable device 200 and 1000 to select another portion of the plurality of the light sources 280 in response to that the iris recognition based on the at least one image fails. In an embodiment, the instructions that, when executed by the at least one processor 120 individually or collectively, may cause the wearable device 200 and 1000 to perform the iris recognition based on at least one another image captured by the camera 310 while the other portion of the plurality of the light sources 280 is controlled to emit light toward the eye of the user and another remaining portion of the plurality of the light sources 280 is deactivated.

In an embodiment, the number of the portion of the plurality of the light sources 280 may be different from the number of the other portion of the plurality of the light sources 280.

In an embodiment, the portion of the plurality of the light sources 280 may be arranged closer to the camera 310 than the other portion of the plurality of the light sources 280.

In an embodiment, the another portion of the plurality of light sources includes the portion of the plurality of light sources.

In an embodiment, the wearable device 200 and 1000 may further comprise a sensor. In an embodiment, the instructions that, when executed by the at least one processor 120 individually or collectively, may cause the wearable device 200 and 1000 to determine whether a lens between the wearable device 200 and 1000 and the eye of the user is identified based on information obtained through the sensor. In an embodiment, the instructions that, when executed by the at least one processor 120 individually or collectively, may cause the wearable device 200 and 1000 to perform the iris recognition based on the at least one image captured by the camera 310 while the portion of the plurality of the light sources 280 is controlled to emit light toward the eye of the user and the remaining portion of the plurality of the light sources 280 is deactivated, based on the lens being identified. In an embodiment, the instructions that, when executed by the at least one processor 120 individually or collectively, may cause the wearable device 200 and 1000 to perform the iris recognition based on at least one image captured by the camera 310 while the same light sources used for performing the eye tracking are controlled to emit light toward the eye of the user, based on the lens not being identified.

In an embodiment, the instructions that, when executed by the at least one processor 120 individually or collectively, may cause the wearable device 200 and 1000 to select the portion corresponding to a refractive index of the lens indicated by the information of the plurality of the light sources 280, based on the lens being identified.

In an embodiment, the instructions that, when executed by the at least one processor 120 individually or collectively, may cause the wearable device 200 and 1000 to perform the iris recognition based on the images captured by the camera 310 for performing the eye tracking while the plurality of the light sources 280 are controlled to emit light toward the eye of the user. In an embodiment, the instructions that, when executed by the at least one processor 120 individually or collectively, may cause the wearable device 200 and 1000 to perform the iris recognition based on the at least one image captured by the camera 310 while the portion of the plurality of the light sources 280 is controlled to emit light toward the eye of the user and the remaining portion of the plurality of the light sources 280 is deactivated, in response to that the iris recognition based on the images fails.

In an embodiment, the camera 310 may comprise a first camera and a second camera. In an embodiment, the instructions that, when executed by the at least one processor 120 individually or collectively, may cause the wearable device 200 and 1000 to perform the eye tracking based on the images captured by the first camera while the plurality of the light sources 280 are controlled to emit light toward the eye of the user. In an embodiment, the instructions that, when executed by the at least one processor 120 individually or collectively, may cause the wearable device 200 and 1000 to perform the iris recognition based on the at least one image captured by the second camera while the portion of the plurality of the light sources 280 is controlled to emit light toward the eye of the user and the remaining portion of the plurality of the light sources 280 is deactivated.

In an embodiment, the instructions that, when executed by the at least one processor 120 individually or collectively, may cause the wearable device 200 and 1000 to in response to determining to perform the iris recognition during the performing of the eye tracking, deactivate the remaining portion of the plurality of light sources.

In an embodiment, the instructions that, when executed by the at least one processor 120 individually or collectively, may cause the wearable device 200 and 1000 to select the two light sources based on context information.

In an embodiment, the instructions that, when executed by the at least one processor 120 individually or collectively, may cause the wearable device 200 and 1000 to in case that it is identified that simultaneous execution of eye tracking and iris recognition is possible, determine to continue the performing of eye tracking. In an embodiment, the instructions that, when executed by the at least one processor 120 individually or collectively, may cause the wearable device 200 and 1000 to in case that it is identified that simultaneous execution of eye tracking and iris recognition is difficult, determine to stop the performing of eye tracking.

A method as described above may be performed in a wearable device 200 and 1000 comprising a plurality of light sources 280 configured to emit light toward an eye of a user wearing the wearable device 200 and 1000, and a camera 310 configured to capture images of at least a part of the eye of the user wearing the wearable device 200 and 1000. According to an embodiment, the method may comprise performing eye tracking based on the images captured by the camera 310 while the plurality of the light sources 280 are controlled to emit light toward the eye of the user. According to an embodiment, the method may comprise performing iris recognition based on at least one image captured by the camera 310 while a portion of the plurality of the light sources 280 is controlled to emit light toward the eye of the user and a remaining portion of the plurality of the light sources 280 is deactivated.

According to an embodiment, the method may comprise selecting another portion of the plurality of the light sources

280 in response to that the iris recognition based on the at least one image fails. According to an embodiment, the method may comprise performing the iris recognition based on at least one another image captured by the camera 310 while the other portion of the plurality of the light sources 280 is controlled to emit light toward the eye of the user and another remaining portion of the plurality of the light sources 280 is deactivated.

A non-transitory computer readable storage medium as described above may store one or more programs including instructions. In an embodiment, the instructions that, when executed by a processor 120 of a wearable device 200 and 1000 comprising a plurality of light sources 280 configured to emit light toward an eye of a user wearing the wearable device 200 and 1000, and a camera 310 configured to capture images of at least a part of the eye of the user wearing the wearable device 200 and 1000, may cause the wearable device 200 and 1000 to perform eye tracking based on the images captured by the camera 310 while the plurality of the light sources 280 are controlled to emit light toward the eye of the user. In an embodiment, the instructions that, when executed by the processor 120, may cause the wearable device 200 and 1000 to perform iris recognition based on at least one image captured by the camera 310 while a portion of the plurality of the light sources 280 is controlled to emit light toward the eye of the user and a remaining portion of the plurality of the light sources 280 is deactivated.

In an embodiment, the instructions that, when executed by the processor 120, may cause the wearable device 200 and 1000 to in response to the iris recognition failing based on the at least one image, select, another portion of the plurality of the light sources. In an embodiment, the instructions that, when executed by the processor 120, may cause the wearable device 200 and 1000 to perform, the iris recognition based on at least one other image captured by the camera while the another portion of the plurality of the light sources is controlled to emit light toward the eye of the user and another remaining portion of the plurality of the light sources is deactivated.

The electronic device according to various embodiments disclosed in the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with" another element (e.g., a second element), it denotes that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply denotes that the storage medium is a tangible device, and does not include a signal (e.g., an electromagnetic wave), but this term does not differentiate between a case in which data is semi-permanently stored in the storage medium and a case in which the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A wearable device comprising:
a plurality of light sources configured to emit light toward an eye of a user wearing the wearable device;
a camera configured to capture images of at least a part of the eye of the user wearing the wearable device;
a light source driver comprising circuitry;
at least one processor comprising processing circuitry; and
memory, comprising one or more storage mediums, storing instructions,
wherein the instructions, when executed by the at least one processor individually or collectively, cause the wearable device to:
perform eye tracking based on the images captured by the camera while the plurality of the light sources are controlled to emit light toward the eye of the user,
perform iris recognition based on at least one image captured by the camera while a first portion of the plurality of the light sources is controlled to emit light toward the eye of the user and a first remaining portion of the plurality of the light sources is deactivated,
in response to the iris recognition failing based on the at least one image, select a second portion of the plurality of the light sources, and
perform the iris recognition based on at least one other image captured by the camera while the second portion of the plurality of the light sources is controlled to emit light toward the eye of the user and a second remaining portion of the plurality of the light sources is deactivated,
wherein the first portion of the plurality of the light sources is arranged closer to the camera than the second portion of the plurality of the light sources,
wherein the plurality of light sources is arranged in output channels of the light source driver,
wherein the first portion of the plurality of the light sources is arranged in a first output channel of the output channels, and
wherein the second portion of the plurality of the light sources is arranged in a second output channel of the output channels.

2. The wearable device of claim 1, wherein the first portion of the plurality of the light sources and the second portion of the plurality of light sources correspond to different sub-sets of same light sources used for performing the eye tracking.

3. The wearable device of claim 1, wherein a number of light sources used for performing the iris recognition is less than a number of light sources used for performing the eye tracking.

4. The wearable device of claim 1, wherein, among the plurality of light sources used for performing the eye tracking, two light sources are selected for performing the iris recognition.

5. The wearable device of claim 1, wherein, among the plurality of light sources used for performing the eye tracking, only one light source is selected for performing the iris recognition.

6. The wearable device of claim 1, wherein a number of the first portion of the plurality of the light sources is different from a number of the second portion of the plurality of the light sources.

7. The wearable device of claim 1, wherein the portion of the plurality of the light sources is arranged to form an acute angle with respect to an axis defined by a direction from a center point of the plurality of the light sources to the eye, and
wherein the portion of the plurality of the light sources is arranged parallel with respect to the axis.

8. The wearable device of claim 1, wherein the light source driver is configured to:
obtain a strobe signal of the camera, and
in response to the strobe signal:
activate all output channels to control the plurality of the light sources to emit light toward the eye of the user and deactivate remaining output channels,
in response to the strobe signal, activate the first output channel to control the first portion of the plurality of the light sources to emit light toward the eye of the user and deactivate remaining output channels, or
in response to the strobe signal, activate the second output channel to control the second portion of the plurality of the light sources to emit light toward the eye of the user and deactivate remaining output channels.

9. The wearable device of claim 1, comprising:
a sensor,
wherein the instructions, when executed by the at least one processor individually or collectively, cause the wearable device to:
determine whether a lens between the wearable device and the eye of the user is identified based on information obtained through the sensor,
based on the lens being identified, perform the iris recognition based on the at least one image captured by the camera while the portion of the plurality of the light sources is controlled to emit light toward the eye of the user and the remaining portion of the plurality of the light sources is deactivated, and
based on the lens not being identified, perform the iris recognition based on at least one image captured by the camera while same light sources used for performing the eye tracking are controlled to emit light toward the eye of the user.

10. The wearable device of claim 9, wherein the instructions, when executed by the at least one processor individually or collectively, cause the wearable device to:
based on the lens being identified, select the portion corresponding to a refractive index of the lens indicated by the information among the plurality of the light sources.

11. The wearable device of claim 1, wherein the instructions, when executed by the at least one processor individually or collectively, cause the wearable device to:
perform the iris recognition based on the images captured by the camera for performing the eye tracking while the plurality of the light sources are controlled to emit light toward the eye of the user, and in response to the iris recognition failing based on the images, perform the iris recognition based on the at least one image captured by the camera while the portion of the plurality of the light sources is controlled to emit light toward the eye of the user and the remaining portion of the plurality of the light sources is deactivated.

12. The wearable device of claim 1, wherein the camera comprises a first camera and a second camera, and wherein the instructions, when executed by the at least one processor individually or collectively, cause the wearable device to:

perform the eye tracking based on the images captured by the first camera, and perform the iris recognition based on the at least one image captured by the second camera.

13. A method performed by a wearable device comprising a plurality of light sources and a camera, the method comprising:

performing, by the wearable device, eye tracking based on images captured by the camera while the plurality of the light sources are controlled to emit light toward an eye of a user;

performing, by the wearable device, iris recognition based on at least one image captured by the camera while a first portion of the plurality of the light sources is controlled to emit light toward the eye of the user and a first remaining portion of the plurality of the light sources is deactivated;

in response to the iris recognition failing based on the at least one image, selecting a second portion of the plurality of the light sources; and performing the iris recognition based on at least one other image captured by the camera while the second portion of the plurality of the light sources is controlled to emit light toward the eye of the user and a second remaining portion of the plurality of the light sources is deacti-vated, wherein the first portion of the plurality of the light sources is arranged closer to the camera than the second portion of the plurality of the light sources, wherein the plurality of light sources is arranged in output channels of a light source driver comprising circuitry of the wearable device, wherein the first portion of the plurality of the light sources is arranged in a first output channel of the output channels, and wherein the second portion of the plurality of the light sources is arranged in a second output channel of the output channels.

14. The method of claim 13, wherein the portion of the plurality of the light sources and the second portion of the plurality of light sources correspond to different sub-sets of same light sources used for performing the eye tracking.

15. The method of claim 13, wherein a number of light sources used for performing the iris recognition is less than a number of light sources used for performing the eye tracking.

16. The method of claim 13, wherein, among the plurality of light sources used for performing the eye tracking, two light sources are selected for performing the iris recognition.

17. The method of claim 13, wherein, among the plurality of light sources used for performing the eye tracking, only one light source is selected for performing the iris recogni-tion.

18. A non-transitory computer-readable storage medium storing one or more computer programs including instruc-tions that, when executed by at least one processor indi-vidually or collectively of a wearable device comprising a plurality of light sources and a camera, cause the wearable device to:

perform, eye tracking based on images captured by the camera while the plurality of the light sources are controlled to emit light toward an eye of a user;

perform, iris recognition based on at least one image captured by the camera while a first portion of the plurality of the light sources is controlled to emit light toward the eye of the user and a first remaining portion of the plurality of the light sources is deactivated;

in response to the iris recognition failing based on the at least one image, selecting a second portion of the plurality of the light sources; and performing the iris recognition based on at least one other image captured by the camera while the second portion of the plurality of the light sources is controlled to emit light toward the eye of the user and a second remaining portion of the plurality of the light sources is deacti-vated, wherein the first portion of the plurality of the light sources is arranged closer to the camera than the second portion of the plurality of the light sources, wherein the plurality of light sources is arranged in output channels of a light source driver comprising circuitry of the wearable device, wherein the first portion of the plurality of the light sources is arranged in a first output channel of the output channels, and wherein the second portion of the plurality of the light sources is arranged in a second output channel of the output channels.

* * * * *